United States Patent [19]
Frasca

[11] Patent Number: 4,747,764
[45] Date of Patent: May 31, 1988

[54] ROTARY FLUID PUMP

[76] Inventor: Joseph F. Frasca, 5801 Yorktown Rd., Lorain, Ohio 44053

[21] Appl. No.: 883,778

[22] Filed: Jul. 9, 1986

Related U.S. Application Data

[63] Continuation-in-part of Ser. No. 690,888, Jan. 14, 1985, Pat. No. 4,653,446.

[51] Int. Cl.$^4$ .............................................. F02B 53/00
[52] U.S. Cl. .................... 418/231; 418/233; 123/244
[58] Field of Search .................. 418/218, 228–233; 123/244

[56] References Cited

U.S. PATENT DOCUMENTS

| | | | |
|---|---|---|---|
| 717,244 | 12/1902 | Morgan | 418/233 |
| 1,999,339 | 4/1935 | Morgan | 418/233 |
| 3,762,844 | 10/1973 | Isaksen | 418/218 |
| 3,769,945 | 11/1973 | Kahre | 418/231 |
| 3,790,314 | 2/1974 | Swain | 418/268 |
| 3,838,954 | 10/1974 | Rapone | 418/218 |
| 4,137,890 | 2/1979 | Wohl | 418/232 |
| 4,437,823 | 3/1984 | Tigane | 418/232 |
| 4,653,446 | 3/1987 | Frasca | 418/233 |

FOREIGN PATENT DOCUMENTS 143132   9/1982   Japan ................................. 123/244

*Primary Examiner*—Carlton R. Croyle
*Assistant Examiner*—Jane E. Obee

[57] ABSTRACT

The invention is fluid pump which in addition to displacing fluid can be a fluid driven motor and when the fluid is compressible a compressor or expanding fluid driven motor. The pump has an annular cavity formed between its rotor and casing and around the rotor rotational axis. There is a power transfer means such as a shaft which drives the rotor in rotation when the pump is used to displace or also to compress a fluid. When the pump is used also as a motor the fluid being displaced is also the power transfer means and the rotor shaft is used for mechanical power take-off. The rotor surface at the annular cavity, the wave surface, has at least one undulation and each wave surface undulation forms with the other cavity surfaces a cavity undulation. A casing surface at the annular cavity, the face surface, has a plurality of circumferential spaced axial plane slots each with a partition pivotally extending into the annular cavity but not abutting the annular cavity walls. The partitions in the annular cavity form a plurality of circumferential spaced volume varying chambers which cyclically vary in volume during their traverse of the cavity undulation(s) with rotor rotation. With rotor rotation, the partitions are displaced in their slots by a rotor cam means outside the annular cavity with undulations which maintain the continuous pivotal extension of the partitions into the annular cavity towards without abutting its surfaces. Where neighbor cavity undulations join there is a sump region of the annular cavity. Each said sump region extends from the exhaust region of one cavity undulation to the neighboring cavity undulation's intake region and volume varying chambers traversing the sump regions have minimum volumes. Each annular cavity undulation in the pump is comprised of (in the direction of volume varying chamber traverse): a sump region segment at its beginning, then an intake region with intake means, then a fluid transfer region, then an exhaust region with exhaust means, and then a sump region segment at its end. In the annular cavity's fluid transfer and the sump regions the partitions are extended to very close proximity with cavity walls. In the pump's operation each volume varying chamber traversing a cavity undulation conveys fluid from the cavity undulation's intake means at its intake region across its fluid transfer region to its exhaust means at its exhaust region. When the fluid is compressible, and the pump is also an (expanding) fluid motor the fluid in a volume varying chambers in the fluid transfer region works on the rotor. When the pump is also a compressor the rotor works on the fluid in the fluid transfer region compressing it. The power loss in the pump due to the allowed mass flow between neighboring volume varying chambers is sustained in the invention rather then the power loss and wear of the parts that occur if the partitions have wiping abutment with the cavity walls.

38 Claims, 7 Drawing Sheets

ROTARY FLUID PUMP

This patent application is a continuation-in-part application of my patent application titled "Rotary Internal Combustion Engine", Ser. No. 06/690,888, Filed: Jan. 14, 1985, U.S. Pat. No. 4,653,446.

BACKGROUND OF THE INVENTION

This device is comprised of a mechanical combination for utilization as a rotary fluid pump, and is based on my abandoned U.S. patent applications:
Ser. No. 031,006; filing date 04/18/79;
Ser. No. 056,875; filing date 07/12/79;
Ser. No. 107,349; filing date 12/26/79;
and the disclosure documents referenced within those applications for patents and the disclosure documents filed while the above applications were still pending and wherein said applications were referenced.

SUMMARY OF THE INVENTION

My invention is a rotary fluid pump having a casing and a rotor mounted for rotation in the casing. It has a power transfer means to the outside; i.e. to an outside power source which drives the rotor in rotation. The power transfer means may be mechanical such as an axial shaft of the rotor or gear combination or their equivalent in operation including the fluid pressure of the fluid being transferred in the pump when the pump is used also as a fluid driven motor.

In the pump is an annular cavity formed between the casing and the rotor about the rotor axis; i.e. axis of rotor rotation. The rotor has a surface, the rotor wave surface, on it about its axis that is the rotor's boundary surface of the annular cavity. The rotor wave surface has at least one undulation in it. An undulation of the wave surface is also referred to herein as a wave surface undulation. In the rotor wave surface with one undulation, said undulation is circumferential the rotor axis; i.e. it goes completely around the rotor axis. When there are more than one undulation of the wave surface, the wave surface undulations join end to end and so joined together are circumferential the rotor axis. All rotor surfaces at the annular cavity are part of the rotor wave surface. There is a face surface on the casing about the rotor axis which is a boundary surface of the annular cavity. The face surface is across the annular cavity from the rotor wave surface and facing it. Each wave surface undulation forms in the annular cavity, with the other annular cavity boundary surfaces thereat, an annular cavity undulation, also referred to herein as a cavity undulation. The annular cavity undulation is generally an undulation in volume of the annular cavity though some portions of the cavity undulation may have constant volume. One of the annular cavity undulation boundary surfaces being the rotor wave surface undulation, the cavity undulation rotates with the rotor. The annular cavity undulations join end to end and so joined are circumferential the rotor axis and are the complete annular cavity.

With reference to a circumferential traverse (i.e. a traverse directed along a circumference, or a segment thereof, about the rotor axis) over a rotor wave surface undulation in the annular cavity and disregarding any surface discontinuity, the initial arc portion of said undulation's surface is close to the annular cavity face surface. Continuing said traverse to its end, said undulation's surface then diverges from the face surface and then converges on the face surface to again be close thereto at its end arc portion. The noted divergence and convergence of the rotor wave surface undulation's surface with the face surface forms, with the other annular cavity surfaces, the annular cavity undulation at the rotor wave surface undulation. With reference a circumferential traverse through an annular cavity undulation, the cavity volume varies from a minimum volume to a maximum volume then back to a minimum volume.

At each rotor wave surface perimeter (circumferential the rotor axis) the rotor has a perimeter boundary surface which mates, for relative rotary motion to, a like surface (perimeter boundary surface) to the casing annular cavity surface at said rotor wave surface perimeter.

There is a plurality of circumferential spaced slots in the casing. Said slots are axially oriented (i.e. in a plane containing the rotor axis) and open to the annular cavity in direction from one perimeter boundary surface to the other. A partition is mounted in each of the casing slots for pivotal, axially directed motion therein and extension therefrom into the annular cavity. The partitions form in the pump's annular cavity a plurality of circumferential spaced volume varying chambers. The volume varying chambers have a cyclical volume variation between a minimum and maximum volume with rotor rotation and their consequent traverse of a cavity undulation.

There is a cam means on the pump's rotor which is circumferential to the rotor axis and outside of the annular cavity. The rotor cam means operatively engages a portion of each partition, thereby pivotally positioning each partition in its slot and in extension into the annular cavity so that each partition edge surface in the annular cavity does not abut the annular cavity surface towards which it extends and forms therewith a gap (i.e. orifice or channel) between the volume varying chambers on either side.

There is an intake region in each annular cavity undulation and intake means at said intake region which directly communicate with the volume varying chambers in the region for the transfer of fluid from outside the pump to said chambers. A volume varying chamber "in" an annular cavity (or cavity undulation) region has some (volume) part within the region. The intake means at the intake region may be an opening in the rotor wave surface or casing intake valves at the volume varying chambers which open in the region.

There is an exhaust region in each annular cavity undulation and exhaust means at said exhaust region which directly communicate with the volume varying chambers in the region for the transfer of fluid to outside the pump from said chambers. The exhaust means at the exhaust region may be an opening in the rotor wave surface or casing exhaust valves at the volume varying chambers which open in the region.

Between and connecting the intake and exhaust regions of each annular cavity undulation there is a fluid transfer region. The rotor cam means keeps each partition edge surface in the fluid transfer region in close proximity to the annular cavity surface towards which it extends to minimize the fluid flow through the gap formed by said surfaces. The fluid transfer region, with the partitions therein, stops direct communication between (i.e. it isolates) the cavity undulation intake means and exhaust means and allows only very minor fluid flow via the gaps therein; i.e. indirect communication. With rotor rotation the volume varying chambers traverse the fluid transfer region conveying fluid acquired from the intake means while in the intake region for expulsion via the exhaust means when in the exhaust region. In the pump, the intake region, the intake means, the fluid transfer region, the exhaust region and the exhaust means of a cavity undulation are also respectively, an intake region, an intake means, a fluid transfer region, an exhaust region and an exhaust means of the annular cavity.

There is a sump region in the pump's annular cavity where the end of one cavity undulation connects to the beginning of its neighboring cavity undulation; i.e. neighboring cavity undulations share an annular cavity sump region where they join. An annular cavity sump region extends from, but not into, the exhaust region of one cavity undulation and includes the end part of said cavity undulation and it extends from said cavity undulation to, but not into, the intake region of the neighboring cavity undulation and includes the beginning part of said neighboring undulation. In each annular cavity sump region the rotor cam means keeps each partition edge surface therein in close proximity to the annular cavity surface towards which it extends to minimize the fluid flow at the gaps. Each annular cavity sump region isolates, except for minor flow through the gaps at the partitions in the region (indirect communication) the exhaust region of one cavity undulation from the intake region of its neighboring cavity undulation at said sump region. In each annular cavity sump region the rotor wave surface is very close to the annular cavity face surface and the volume varying chambers traversing the sump region have minimum volume which minimizes the fluid they convey from one cavity undulation to its neighboring cavity undulation at said sump region.

With rotation of the pump's rotor by the power transfer means, the volume varying chambers traverse each cavity undulation of the annular cavity. Each (volume varying) chamber traversing a cavity undulation sequentially exits the annular cavity sump region part at the undulation's beginning, and with said exit, enters the undulation's intake region and takes in fluid via its direct communication with the intake means there. Then the chamber exiting the intake region enters the undulation's fluid transfer region and its direct communication with the intake means is terminated on complete entry therein and it has no direct communication with the undulation's exhaust means. Exiting the undulation's fluid transfer region the chamber enters the undulation's exhaust region and expels its fluid contents via its direct communication with the undulation's exhaust means there. Exiting the exhaust region the chamber enters the sump region part at the end of the cavity undulation and its direct communication with the exhaust means is terminated on complete entry into the sump region. The volume varying chamber completely within the annular cavity sump region has minimum volume and no direct communication with the annular cavity intake means or exhaust means. With further rotor rotation the chamber enters the next cavity undulation repeating the above fluid transfer sequence. With sufficient rotor rotation rates the fluid flow through the gaps in each annular cavity sump region and fluid transfer region is insignificant when compared to the fluid moved from the intake means to exhaust means of the annular cavity by the volume varying chambers.

In the incompressible fluid pump, the volume varying chambers increase in volume taking in fluid via intake means and decrease in volume expelling their fluid contents via exhaust means only in the intake and the exhaust regions, respectively, of the annular cavity.

When the pump is also a fluid motor (pump-motor) the power transfer means driving the rotor is the fluid being pumped and the rotor has a mechanical power take off means such as an axial shaft used to transfer to outside the pump the mechanical power converted in the pump from the flow energy of the fluid being pumped.

The above incompressible pump and pump-motor may be effectively used with compressible fluid.

In the designs of compressible fluid pumps, the volume varying chambers' volumes need not remain constant when they're completely within the annular cavity's fluid transfer and sump regions.

With compressible fluid, the pump may be additionally used as a compressor (pump-compressor) wherein the fluid being pumped is compressed within the unit. The rotor in the pump-compressor, driven in rotation by the power transfer means, works both to pump and compress the fluid in the volume varying chambers traversing the fluid transfer regions before the chambers enters the exhaust regions.

With compressible fluid the pump may additionally be used as a fluid motor (pump-motor) wherein the expansion of high pressure compressible fluid contents of the volume varying chambers in the pump's fluid transfer regions act on the rotor driving it in rotation to pump the fluid and for power output at the power take-off means.

The pump may have a mechanical loading means acting between the casing and the partitions which coact with the rotor cam means to effect the partitions' pivotal movement in and extension from their slots into the annular cavity so that their edge surfaces therein do not abut the annular cavity surfaces towards which they extend.

In my invention the internal wear and internal work losses which would result if the volume varying chambers in the annular cavity sump and fluid transfer region(s) were closed to one another are greatly reduced. They are replaced by the loss of the fluid transferred per rotor revolution resultant the allowed albeit small fluid flow between volume varying chambers through the gaps in the fluid transfer regions and sump regions of the the annular cavity.

BRIEF DESCRIPTION OF THE DRAWINGS

FIG. "1" is a sectional and broken away side view of an embodiment of the pump invention for use as a fluid compressor or fluid motor with fluid expansion and taken with reference lines I—I of FIG. 4.

FIG. "2" is a side sectional and broken away view of the rotor element in FIG. 1 taken with reference to lines II—II in FIG. 3.

Figure 1:
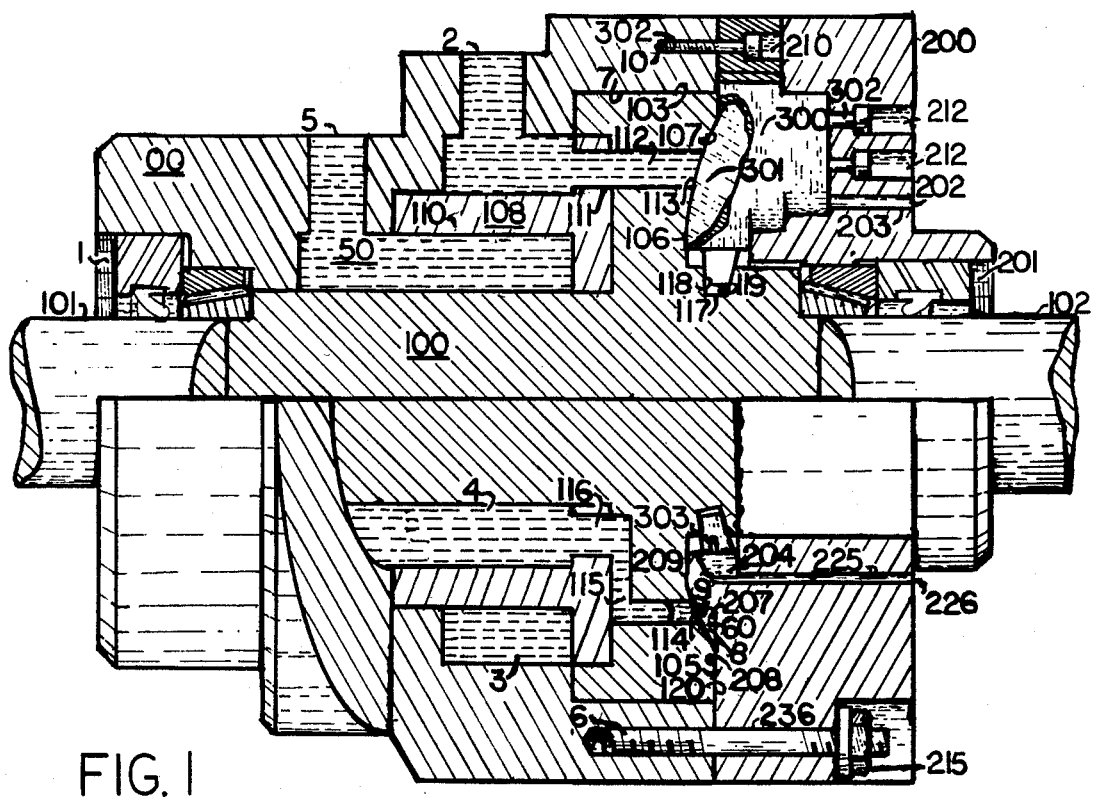
Figure 2:
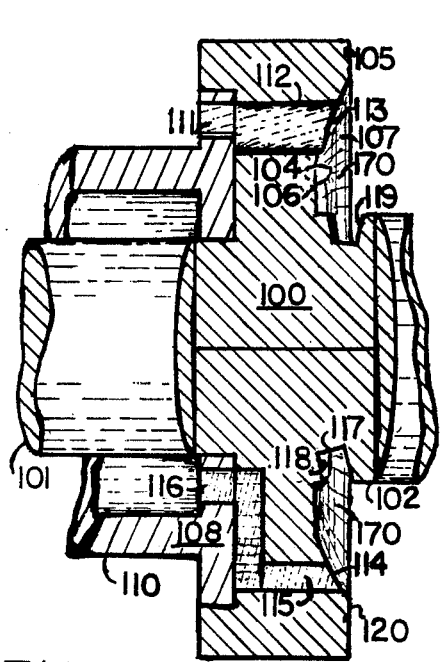

FIG. "3" is a wave surface end view of the rotor of FIG. 1.

FIG. "4" is an end view of the rotor mounted in casing section 00 of FIG. 1 taken from the annular cavity side.

FIG. "5" is an enlarged side oblique view of a partition assembly of the pump in FIG. 1.

Figure 5:
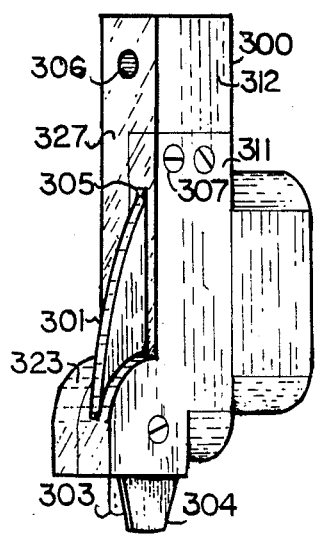
Figure 6:
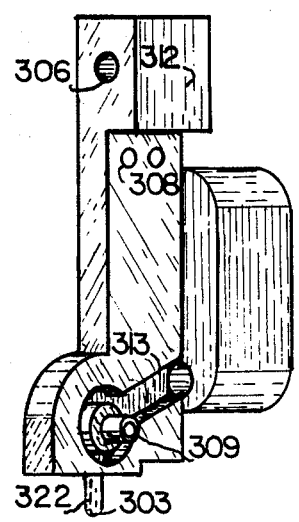
Figure 7:
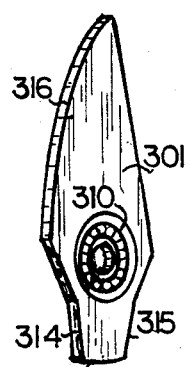
Figure 8:
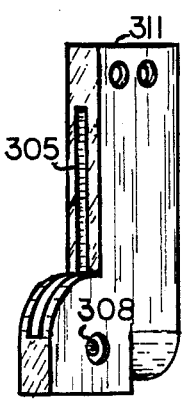
Figure 9:
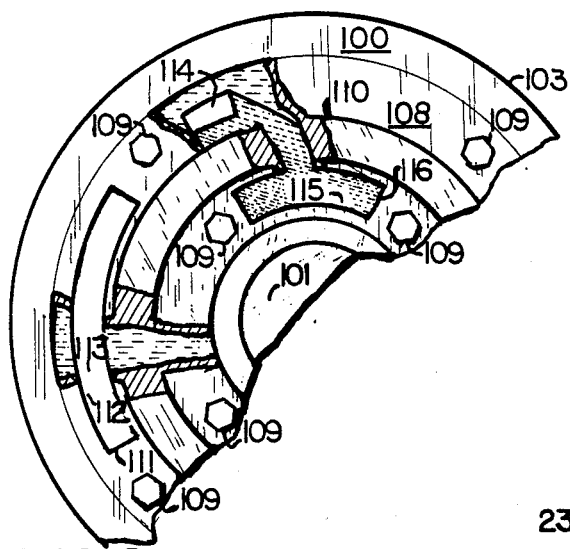
Figure 10:
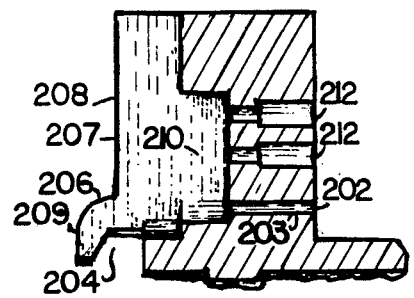

FIG. "6" is an enlarged side oblique view of the lubricant supply section of the partition assembly in FIG. 5.

FIG. "7" is an enlarged side oblique view of the partition of the partition assembly in FIG. 5.

FIG. "8" is an enlarged side oblique view of the partition retaining section of the partition assembly in FIG. 5.

Figure 3:
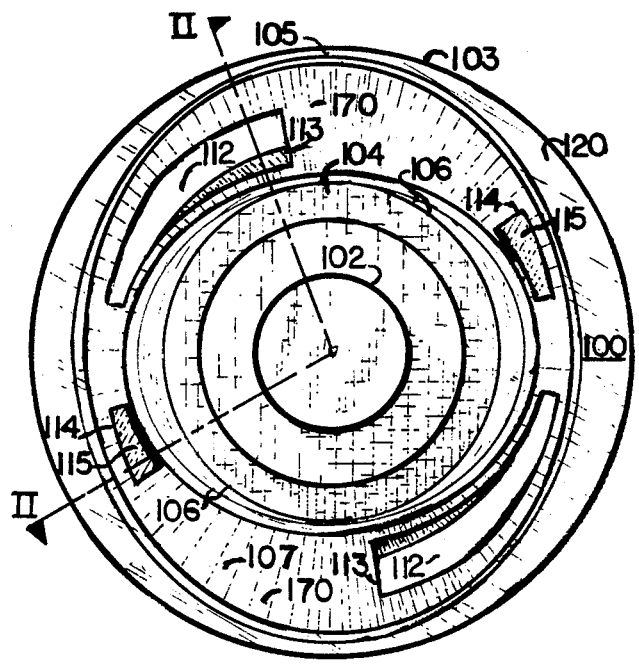

FIG. "9" is a broken away rear view of the rotor in FIG. 3.

Figure 11:
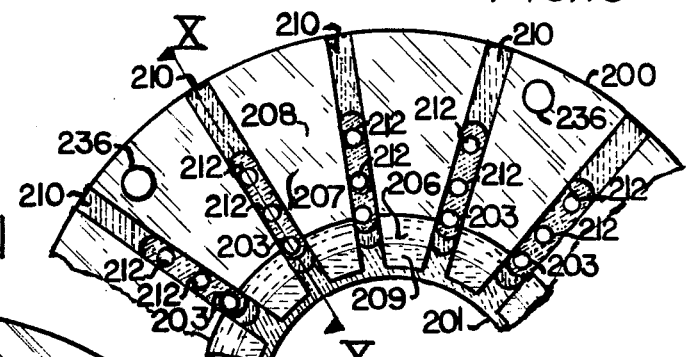

FIG. "10" is a section and broken away view of the partition assembly retaining slot of the casing in FIG. 1 taken with reference to line X—X of FIG. 11.

FIG. "11" is a broken away view of the face surface side of the casing section 200 of FIG. 1 with the partition assembles removed.

FIG. "12" is a view as in FIG. 11 but with the partition assembles.

Figure 12:
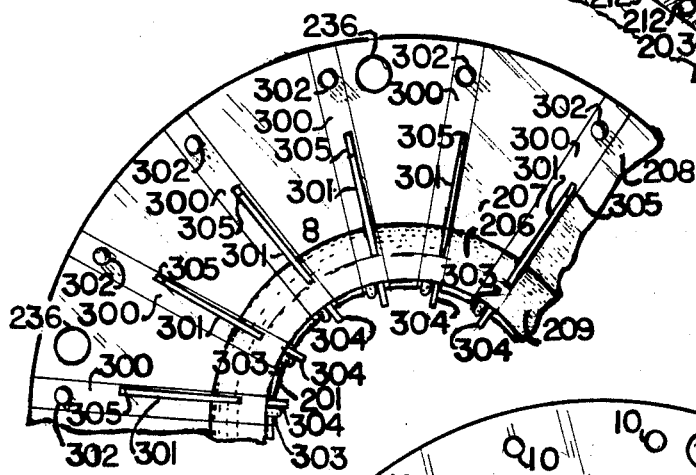
Figure 13:
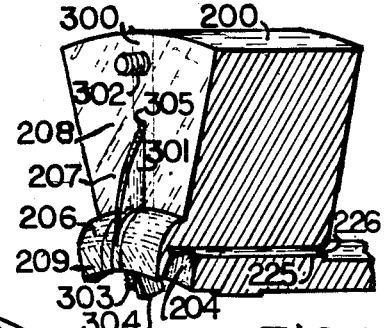
Figure 14:
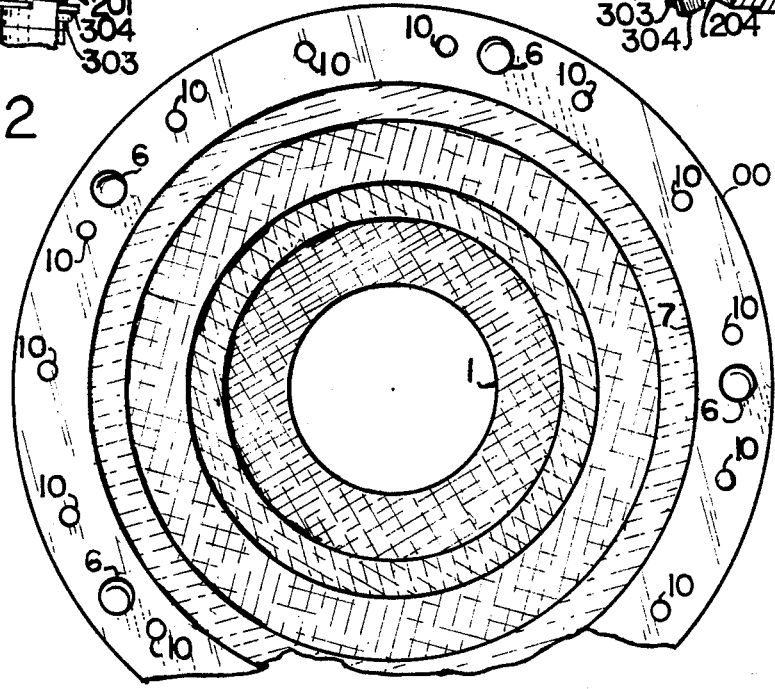

FIG. "13" is an oblique section and broken away view of FIG. 12 casing.

FIG. "14" is a rotor end view of the casing section 00 of FIG. 1.

Figure 4:
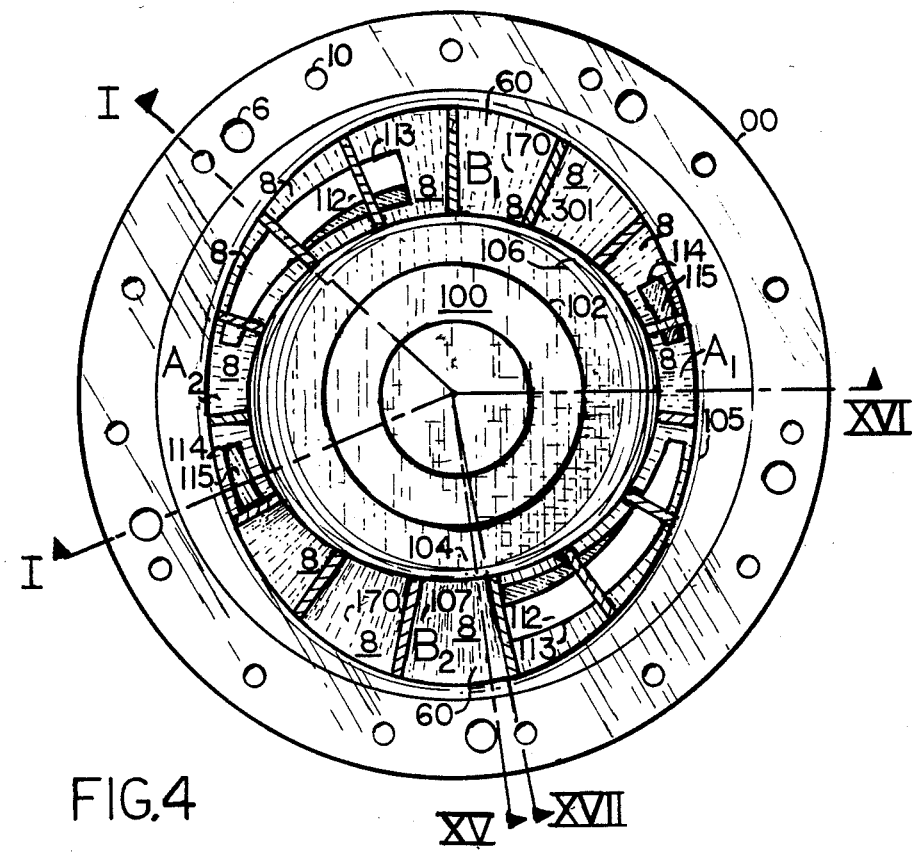

FIG. "15" is a representational section and broken away view of the annular cavity of FIG. 1 with reference line XV- of FIG. 4.

Figure 15:
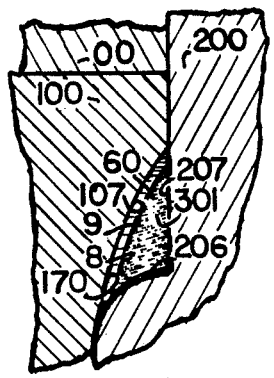
Figure 16:
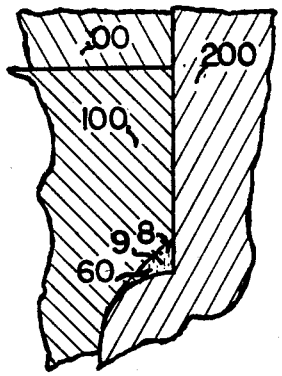
Figure 17:
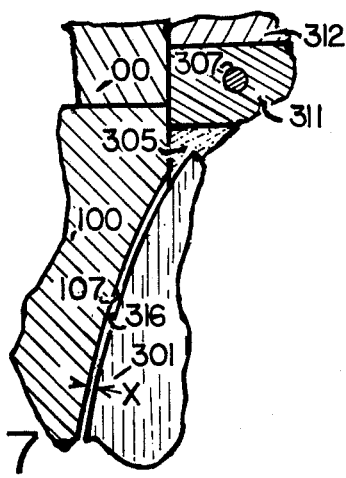

FIG. "16" is a portrayal of the annular cavity as in FIG. 15 but taken with reference to line XVI- of FIG. 4.

FIG. "17" is a portrayal of the annular cavity as in FIG. 15 but taken with reference to line XVII- of FIG. 4.

FIG. "18" is a sectional and broken away protrayal of another embodiment of my pump wherein the casing at the annular cavity is conic like in shape and exterior the rotor outer surface at the annular cavity.

FIG. "19" is a sectional and broken away protrayal of another embodiment of my pump with rotor to casing arranged as in FIG. 1 but with the partitions pivot points outside the outer circumference of the annular cavity.

FIG. "20" is a sectional and broken away protrayal of another embodiment of my pump wherein the casing at the annular cavity is cylindrical and interior the conical like inner surface of the rotor at the annular cavity.

Figure 20:
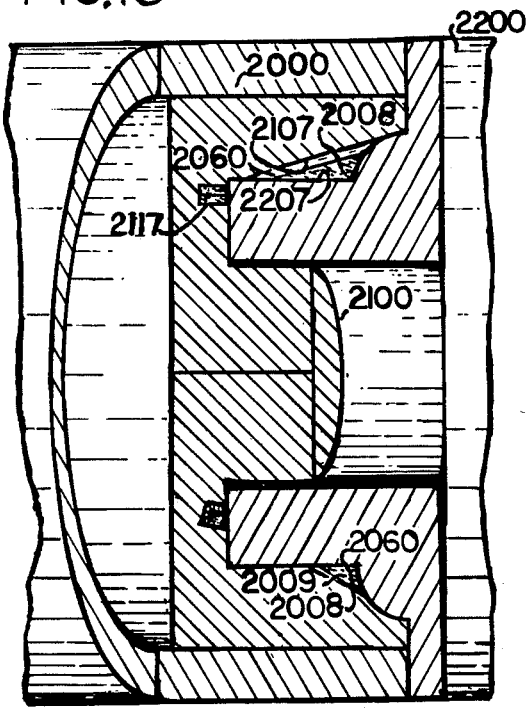
Figure 21:
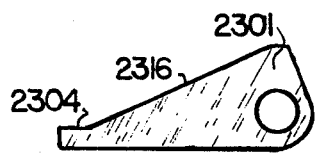

FIG. "21" is a partition used in the pump portrayed in FIG. 20.

FIG. "22" is a sectional and broken away portrayal of a pump as in FIG. 1 but wherein springs means are included in the partition displacing means.

Figure 22:
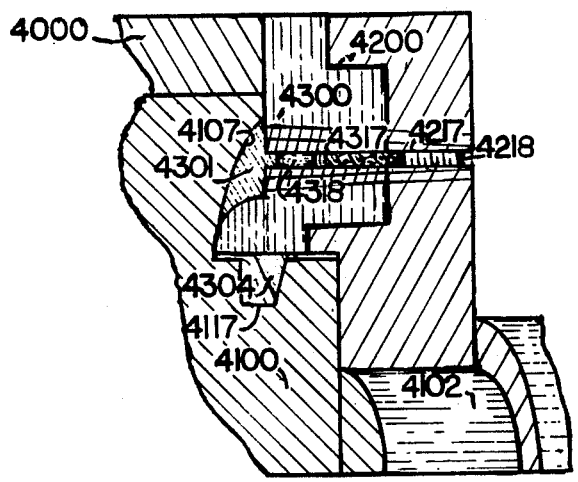
Figure 23:
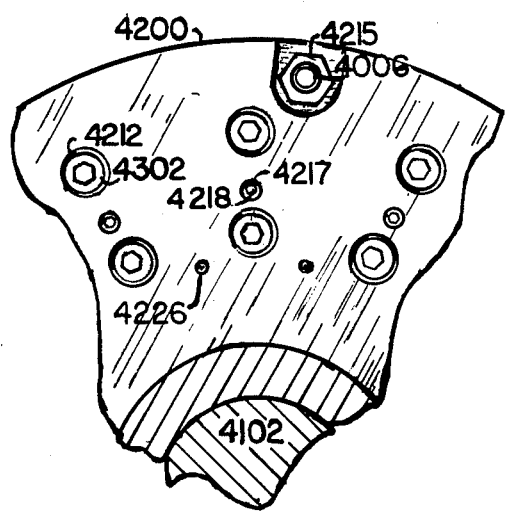
Figure 24:
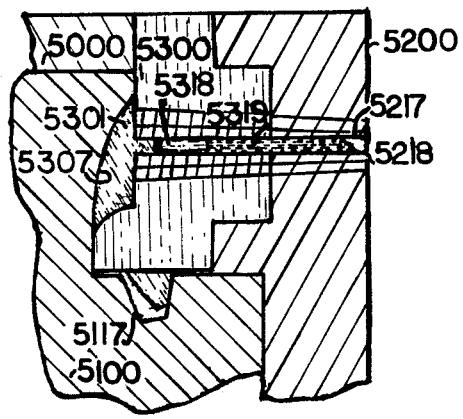

FIG. "23" is a section and broken away end view of the partition retaining casing section of the pump in FIG. 22.

FIG. "24" is a pump as portrayed in FIG. 22 where the partition displacing springs are replaced by fluid pressure.

Figure 18:
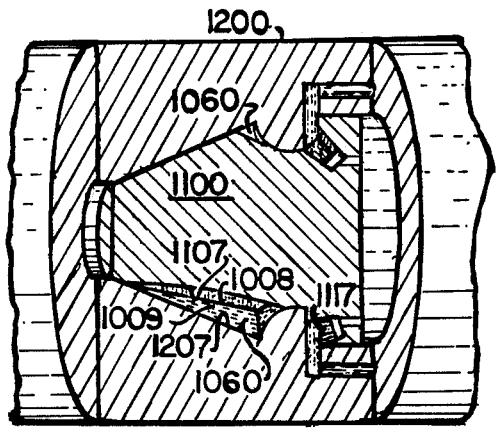
Figure 19:
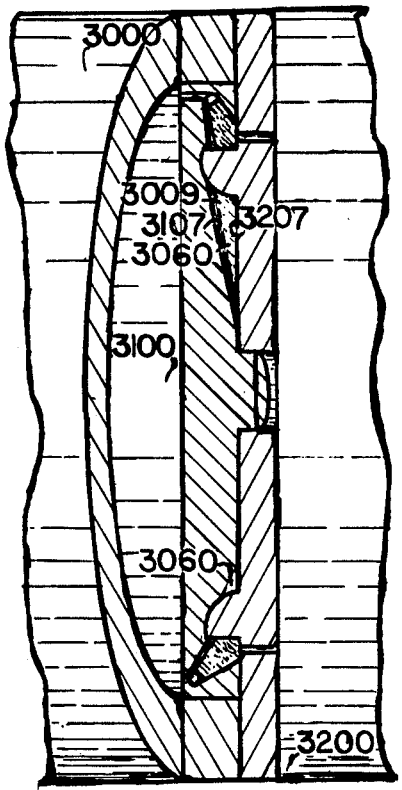
Figure 26:
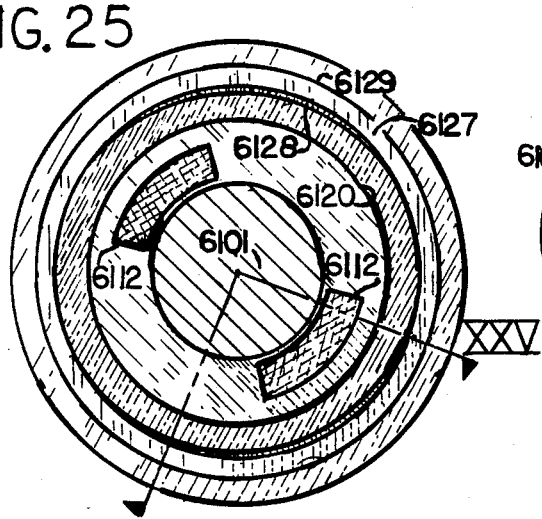
Figure 29:
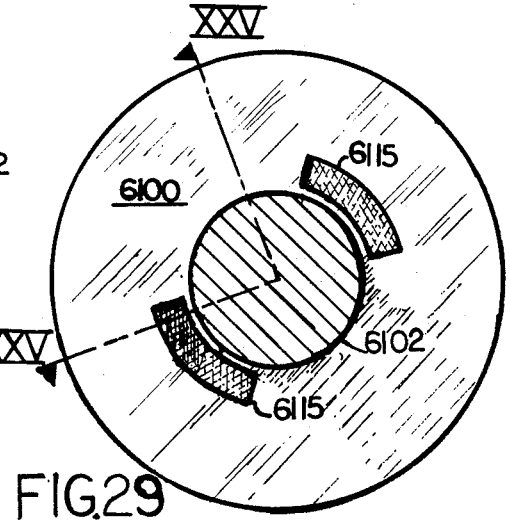

FIG. "25" is a sectional and broken away portrayal of another embodiment of the pump invention, similar to FIG. 18 and taken with reference to the lines XXV—XXV of FIGS. 26 and 29.

Figure 25:
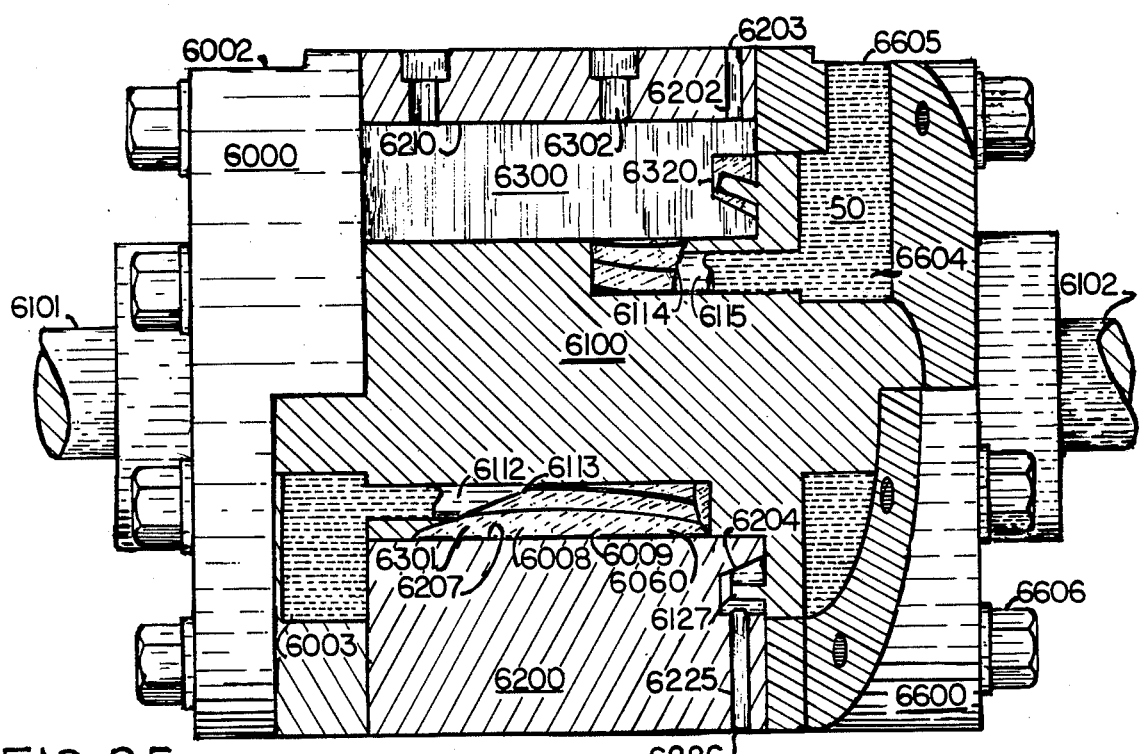

FIG. "26" is a section end view of the rotor of FIG. 25 directed towards the rotor cam rail.

FIG. "27" is a right side broken away view of the rotor in FIG. 26.

Figure 27:
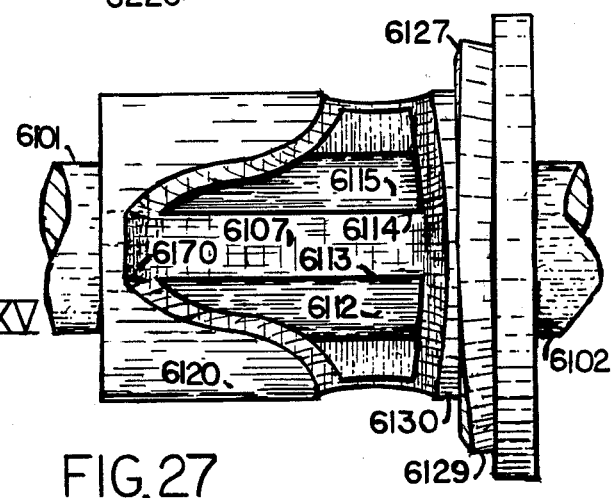

FIG. "28" is a view of the rotor in FIG. 27 rotated a quarter turn.

Figure 28:
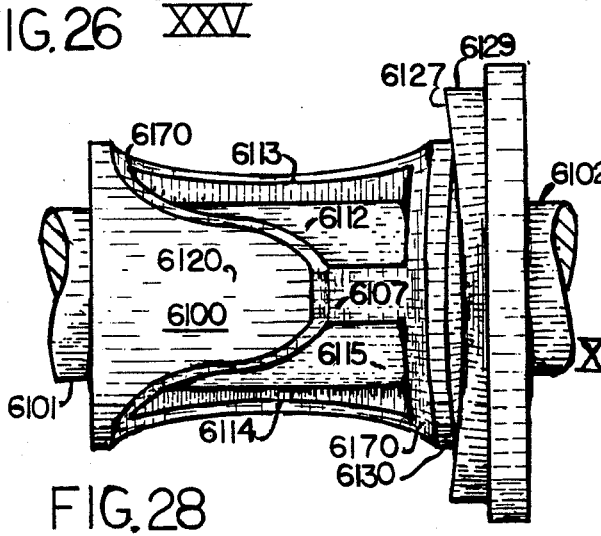

FIG. "29" is a right side view of the rotor in FIG. 28.

FIG. "30" is a broken away view of the sump channel end of the face surface causing section of the pump in FIG. 25.

Figure 30:
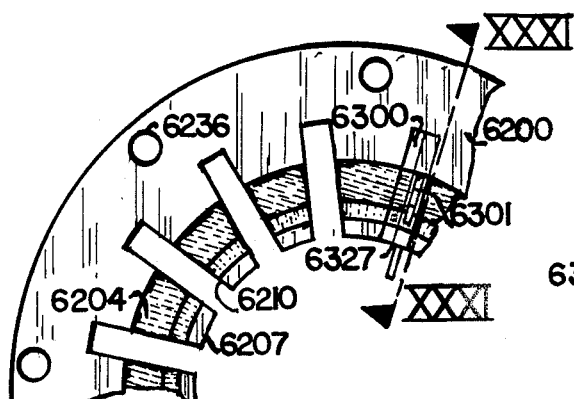
Figure 31:
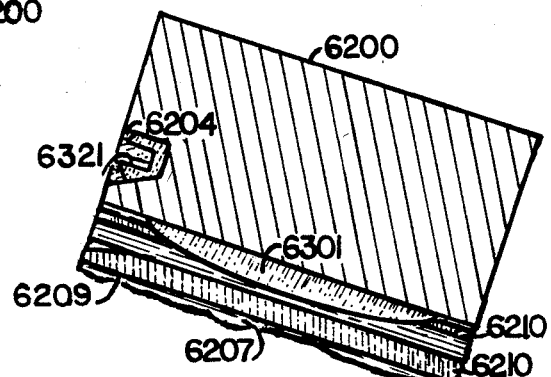

FIG. "31" is a section and broken away protrayal of the casing section of FIG. 30 taken with reference to line XXXI—XXXI in FIG. 30.

FIG. "32" is an enlarged side oblique portrayal of a partition assembly of the pump in FIG. 25.

Figure 32:
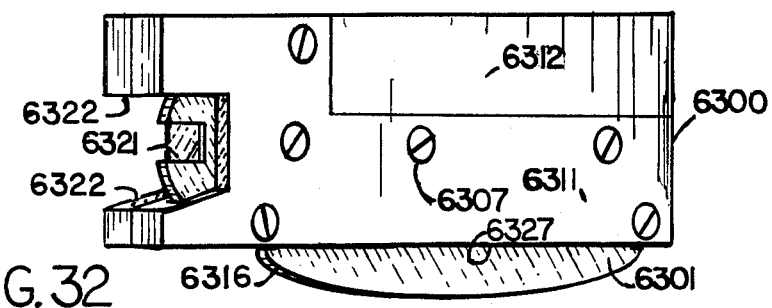
Figure 33:
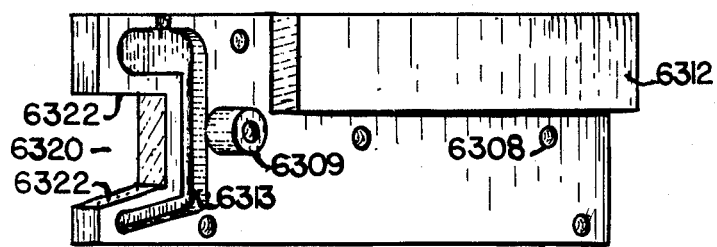
Figure 34:
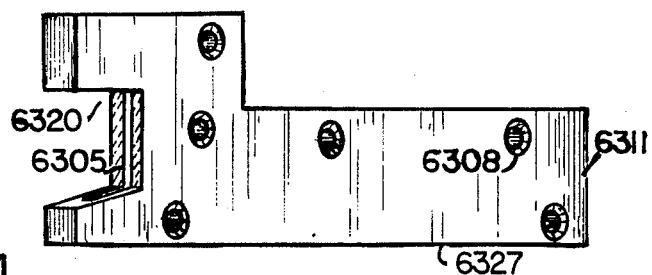
Figure 35:
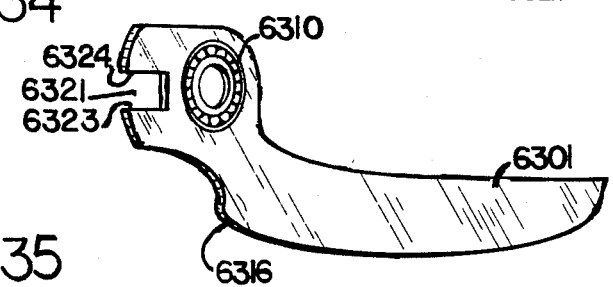

FIG. "33" is an enlarged side oblique portrayal of the lubricant spray section of the partition assembly in FIG. 32.

FIG. "34" is an enlarged side oblique portrayal of the partition slot section of the partition assembly in FIG. 32.

FIG. "35" is an enlarged side oblique portrayal of the partition of the partition assembly in FIG. 32.

DETAILED DESCRIPTION AND SPECIFICATION OF THE INVENTION

My invention is a rotary fluid pump having a casing and a rotor mounted for rotation in the casing. It has a power transfer means to the outside; i.e. to an outside power source which drives the rotor in rotation. The power transfer means may be mechanical such as an axial shaft of the rotor or gear combination or their equivalent in operation including the fluid (with its intrinsic pressure) being transferred in the pump when the pump is used also as a fluid driven motor. In pumps of the invention wherein the fluid being pumped is also the power transfer means, then the pump (pump-motor) has mechanical linkage, such as a rotor shaft, as its power take-off means supplying mechanical energy to outside the pump.

In the pump an annular cavity is formed by and between the rotor and the casing. The rotor axis of rotation (i.e. the rotor axis) is through the annular cavity center. That is, the annular cavity is circumferential to the rotor axis; i.e. it goes completely around the rotor axis. The rotor has a wave surface at the annular cavity which is circumferential to the rotor axis. All rotor surfaces which are annular cavity boundary surfaces are in the rotor wave surface. The casing has a face surface at the annular cavity. The face surface faces the rotor wave surface across the annular cavity and is also circumferential to the rotor axis. The boundary surfaces of the annular cavity are at least the rotor wave surface and the casing face surface. The rotor has perimeter surfaces to the wave surface at the wave surface perimeters and the casing face surface, or surface extension thereof or surface extending therefrom to the rotor, has perimeter surfaces mating the rotor perimeter surfaces. The motor wave surface has at least one wave like relief or undulation in it's surface. The term "undulation" herein means also "wave like relief". Each rotor wave surface undulation may be sinusoidal in nature. If the rotor wave surface has one undulation, the undulation is circumferential the rotor axis and its two ends join (are contiguous); i.e. the wave surface undulation is continuous about the rotor axis, and it is its own neighboring wave surface undulation. In a rotor wave surface with more then one undulation, the wave surface undulations join end to end, and so joined are collectively circumferential the rotor axis; i.e. each undulation is a segment (a circumferential segment) of a continuous circumference about the rotor axis. In an incompressible fluid pump which has the rotor wave surface boundary of its fluid transfer or its sump region(s) in a plane perpendicular to the rotor axis and partitions with straight in length edge surfaces at the rotor wave surface (as in FIG. "21") each said wave surface boundary is flat. The wave surface has discontinuity in pumps having intake means and/or exhaust means openings to the annular cavity in the rotor's wave surface.

The magnitude of the annular cavity volume at any specified location is the volume, at the specified annular cavity location, of a small annular cavity segment, a wedge element, which is bounded on its ends by axial planes displaced a small increment angle from each other and said small increment angle is constant regardless a wedge element's annular cavity location.

A circumferential segment of the annular cavity whose entire rotor wave surface boundary is a complete rotor wave surface undulation and whose end boundaries are the axial planes through the ends of said wave surface undulation, is an annular cavity undulation, which is also herein referred to as a cavity undulation. The annular cavity is completely comprised of its cavity undulations joined end to end. In all embodiments the invention, each cavity undulation's boundary surfaces include a rotor wave surface undulation and each cavity undulation rotates with the rotor.

An annular cavity undulation, from one end to its other, is generally a wave like variation in the annular cavity volume from minimum volume to maximum volume and back to minimum volume (as indicated with wedge elements). In incompressible fluid pumps and pump-motors, the fluid transfer region and the sump region parts in the cavity undulations have constant maximum and constant minimum volume, respectively.

With reference a circumferential traverse over a rotor wave surface undulation in the annular cavity and disregarding any discontinuity thereof, the initial arc portion of the wave surface undulation's surface is close to the annular cavity face surface. The wave surface undulation's surface then diverges from the face surface and then converges on the face surface to again be close thereto at its end arc portion. The noted divergence and convergence of the rotor wave surface undulation's surface with the face surface forms, with the other annular cavity surfaces, the annular cavity undulation at the rotor wave surface undulation. With reference a circumferential traverse through a cavity undulation, at the cavity undulation's initial arc portion, which is also the initial arc portion of the rotor wave surface undulation and the wave surface undulation's surface is very close to the face surface thereat, the cavity undulation has a minimum volume. The cavity undulation then increases in volume while the wave surface undulation's surface diverges from the face surface and the cavity undulation's volume becomes maximum where the wave surface undulation's surface is farthest from the face surface. Then the cavity undulation's volume decreases while the wave surface undulation's surface converges on the face surface, and the cavity undulation's volume becomes minimum again where the wave surface undulation's surface, at its end arc portion, is again very close to the face surface.

In the casing are a plurality of axially oriented slots which are circumferential spaced about the rotor axis. The slots open to the annular cavity across the annular cavity face surface in the direction from one perimeter surface of the casing's annular cavity surface at the rotor to the other.

A partition is mounted in each of the casing slots for axial, pivotal motion therein. Each partition pivotally extends from its slot axially into the annular cavity, and its edge surface in the annular cavity does not abut the annular cavity surface towards which it extends and in portions of the annular cavity (the sump and fluid transfer regions) there is close proximity between said edge surface and said annular cavity surface.

The rotor has a continuous cam means which is circumferential to the rotor axis and located outside the annular cavity. The rotor cam means operatively engages a portion of each partition. Said engagement is, with adequate rotor rotation rate, through hydrodynamic interaction.

The operative engagement of the partitions by the rotor cam means effects the pivotal extension of the individual partitions from their slots into the annular cavity keeping the partition's edge surface in the annular cavity extending towards without abutting the annular cavity surface towards which it extends.

A plurality of circumferential spaced volume varying chambers are in the annular cavity. A volume varying chamber is in the annular cavity between consecutive partitions. With rotation of pump's rotor and the consequent traverse of each annular cavity undulation by the volume varying chambers, each volume varying chamber's volume cyclically varies between minimum and maximum volume.

Formed in the annular cavity by each partition edge surface therein and the annular cavity surface towards which it extends is a gap which may also be termed, a channel, a nozzle, or an orifice. When the partition edge surface is in close proximity to the annular cavity surface towards which it extends, the gap allows only a very small flow of fluid from one volume varying chamber at the partition to its neighbor at the partition whose fluid contents have a lower pressure.

There is an intake region in each cavity undulation and intake means at the cavity undulation for the transfer of fluid from outside the pump to volume varying chambers in the intake region where they directly communicate with the intake means. When the intake means include an opening in the rotor wave surface for the passage of fluid to the volume varying chambers in the intake region, said region is bounded by the axial planes located at the circumferential extremes of said opening. When the intake means include a casing intake means valve at each volume varying chamber which opens to the cavity undulation intake region, the intake region has, at its circumferential extremes, fixed end boundary planes (not necessarily flat) which are askew true axial planes. In pump operation, when a volume varying chamber's intake means valve just opens its leading partition's proximal surface (i.e. the first partition of said chamber in the direction of chamber travel and its boundary surface of the said chamber) coincides with one said intake region end boundary and when a volume varying chamber's intake means valve just closes its following partition's proximal surface (i.e. the second partition of said chamber in the direction of chamber travel and its boundary surface of the chamber) coincides with the other intake region end boundary.

There is an exhaust region in each cavity undulation and exhaust means at the cavity undulation for the transfer of fluid to outside the pump from the volume varying chambers in the exhaust region where they directly communicate with the exhaust means. When the exhaust means include an opening in the rotor wave surface for the exit of fluid from the volume varying chambers in the exhaust region, said region is bounded by the axial planes located at the circumferential extremes of said opening. When the exhaust means include a casing exhaust means valve at each volume varying chamber which opens to the cavity undulation in the exhaust region, the exhaust region has, at its circumferential extremes, fixed end boundary planes (not necessarily flat) which are askew true axial planes. In pump operation, when a volume varying chamber's exhaust means valve just opens its leading partition's proximal surface coincides with one exhaust region end boundary and when a volume varying chamber's exhaust means valve just closes its following partition's proximal surface coincides with the other exhaust region end boundary.

In each cavity undulation of the pump between and connecting the intake and exhaust regions of the annular cavity undulation there is a fluid transfer region. In designing a pump with the smallest (in circumferential arc extent) possible fluid transfer region, its extent must allow at least one partition to be always therein; i.e. it is at least one volume varying chamber arc in extent. The rotor cam means operative engagement with the partitions which are in the fluid transfer region, keeps each partition edge surface therein in close proximity to the annular cavity surface towards which it extends to minimize the fluid flow through the gap formed by said surfaces. The fluid transfer region, with the partitions therein, stops direct communication between the cavity undulation intake means and exhaust means and allows only very minor fluid flow via the gaps therein; i.e. indirect communication. With rotor rotation the volume varying chambers traverse the annular cavity undulation conveying fluid they acquire from the intake means, while in the intake region, across the fluid transfer region for expulsion to outside the pump via the exhaust means when they are in the exhaust region.

There is a sump region of the annular cavity wherever adjacent cavity undulations join; i.e. there is a sump region of the annular cavity where the end of one cavity undulation joins the beginning of its neighboring cavity undulation. When the annular cavity has only one cavity undulation, the cavity undulation's ends join. The annular cavity sump region is located where the cavity undulation's ends join and the cavity undulation is its own neighbor. Neighboring cavity undulations share an annular cavity sump region. Each annular cavity sump region extends from, but not into, the exhaust region of one cavity undulation and includes the end part of said cavity undulation and it extends from said cavity undulation to, but not into, the intake region of the neighboring cavity undulation and includes the beginning part of said neighboring undulation. The rotor cam means operative engagement with the partitions in the annular cavity sump regions, keeps each partition edge surface therein in close proximity to the annular cavity surface towards which it extends to minimize the fluid flow through the gap formed by said surfaces. The sump region, with the partitions therein, isolates, except for very minor flow through the gaps in the region, the exhaust region of one undulation from the intake region of its neighboring undulation. In the pumps, the rotor wave surface is very close to the cavity face surface in the annular cavity sump region and the volume varying chambers traversing the sump region are minimum in volume, thereby minimizing the fluid they convey through the sump region from one cavity undulation (and its exhaust means) to its neighboring cavity undulation (and its intake means). In a pump designed with sump region(s) of minimum extent, each said sump region has at least one partition always therein; i.e. it is at least one volume varying chamber arc in extent.

The annular cavity sump region part at the intake region end of a cavity undulation, the intake region, the intake means, the fluid transfer region, the exhaust region, and the exhaust means of said cavity undulation along with the annular cavity sump region part at its exhaust region end are also, respectively, a sump region part, an intake region, an intake means, a fluid transfer region, an exhaust region, an exhaust means and a sump region part of the annular cavity.

Assuming each annular cavity undulation of a pump begins and ends at the midpoint of an annular cavity sump region, then the annular cavity of the pump with one cavity undulation is sequentially (from end to end in the direction the volume varying chambers traverse with rotor rotation) comprised of the volume segment: end half of the sump region, the intake region, the fluid transfer region, the exhaust region and the beginning half of the sump region. Annular cavities with more then one cavity undulation have the above arrangement of volume segments at each cavity undulation; however, each cavity undulation's end segments are not part of the same annular cavity sump region.

With rotor rotation the volume varying chambers traverse each annular cavity undulation. Traversing a cavity undulation each volume varying chamber sequentially exits the annular cavity sump region part at the beginning of the cavity undulation, and while exiting the sump region enters the cavity undulation's intake region. With a part of the volume varying chamber in the intake region, said chamber has direct communication with the cavity undulation's intake means and it takes in fluid, (supplied from outside the pump) thereby. Said intake of fluid is effected by a greater fluid pressure at said intake means then fluid pressure of the volume varying chamber's contents and/or the increase in volume of the volume varying chamber while directly communicating with the intake means during said chambers traverse of the intake region. Traversing further the volume varying chamber exits the cavity undulation's intake region and while still partly therein said direct communication is extant. Said chamber exiting the intake region enters the cavity undulation's fluid transfer region and when completely therein no longer communicates directly with the cavity undulation's intake means and does not communicate directly with the cavity undulation's exhaust means. Exiting the cavity undulation's fluid transfer region the volume varying chamber enters the cavity undulation's exhaust region and with a part of the volume varying chamber in the exhaust region it has direct communication with the cavity indulation's exhaust means and expels thereby to outside the pump the fluid contents it acquired via the cavity undulation's intake means. Said fluid expulsion is effected by the higher fluid pressure of the volume varying chamber contents relative the fluid pressure in the exhaust means and/or the decrease in volume of the volume varying chamber while directly communicating with exhaust means during said chamber's traverse of exhaust region. Direct communication with the exhaust means continues while the volume varying chamber, exiting the exhaust region, enters the annular cavity sump region segment at the cavity undulation end and said communication ends when the volume varying chamber is completely within said annular cavity sump region.

With sufficient rotor rotation rate the fluid flow through the gaps at the partition in the annular cavity sump and the fluid transfer region(s) is insignificant when compared to the fluid moved from the intake means to the exhaust means of the annular cavity by the volume varying chambers.

As noted above, in pump operation the rotor cam means operative engagement with the partitions, which continuously adjusts the partitions pivotal extension from their slots into the annular cavity, maintains the gaps between the partitions' edge surfaces in the annular cavity and the annular cavity surface towards which they extend in their traverse of the annular cavity with rotor rotation. The operative engagement of the rotor cam means with the partitions also maintains the close proximity between the partitions' edge surfaces in the annular cavity and the annular cavity surfaces towards which they extend in the fluid transfer and the sump regions of the annular cavity. The partitions' pivotal motion in their slots discussed above, may be effected by the rotor cam means coacting with a mechanical means such as a spring or a hydraulic piston also acting on the partitions.

With rotor rotation in pumps for incompressible fluid, each volume varying chamber of the pump traversing the intake region of a cavity undulation (some portion of said chamber is in the intake region) increases in volume and while increasing in volume takes in fluid from outside the pump supplied by the intake means it communicates with while therein. Then, at a maximum volume, the volume varying chamber discontinues said communication and traverses the cavity undulation's fluid transfer region and while wholly therein its volume remains a constant maximum. Throughout the fluid transfer region there is a fixed orientation between the face surface and rotor wave surface intercept lines (an intercept line is formed at the intersection of two planes) in all axial planes through the fluid transfer region and said fixed orientation is at the greatest divergence of the rotor wave surface from the face surface in the cavity undulation. The partitions in the cavity undulation's fluid transfer region have their greatest pivotal extension into the annular cavity, are not pivotally displaced while therein and their edge surfaces therein are in close proximity to the annular cavity surfaces towards which they extend. The volume varying chamber while exiting the fluid transfer region enters the cavity undulation's exhaust region. While in the exhaust region during its traverse, the volume varying chamber decreases in volume and while decreasing in volume communicates directly with exhaust region's exhaust means through which it expels its fluid contents to outside the pump. The volume varying chamber while exiting the cavity undulation's exhaust region enters, at the cavity undulation's end segment, a sump region of the annular cavity and when completely therein the volume varying chamber no longer communicates with the exhaust means and has constant minimum volume. Throughout the annular cavity sump region there is a fixed orientation between the face surface and rotor wave surface intercept lines in all axial planes through said sump region and said fixed orientation is at the smallest divergence of the rotor wave surface from the face surface in the cavity undulation. The partitions in an annular cavity sump region have their smallest pivotal extension into the annular cavity, are not pivotally displaced therein and their edge surfaces therein are in close proximity to the annular cavity surfaces towards which they extend. Traversing further, the volume varying chamber exiting the said sump region's end segment in the neighboring cavity undulation enters the neighboring undulation intake region, and repeats the above fluid transfer sequence.

The pump's intake and exhaust means at each cavity undulation includes the channels, ports and apertures of the pump to fluid circuits outside the pump. The intake and exhaust means can include intake and exhaust apertures in the rotor wave surface at the intake and exhaust region of each cavity undulation respectively. When the power transfer means driving the pump's rotor in rotation is an axial shaft or the like and not the fluid being pumped, the intake and/or exhaust means can also include fluid pressure actuated valves (such as check valves) in the casing at each volume varying chamber. The intake and/or exhaust means might alternatively include mechanical linkage actuated valves whose open or closed position is determined by virtue of the annular cavity location of the volume varying chamber they serve. The first and last examples of intake and exhaust means are also effective when the pump is used as a fluid motor. When the pump is also a fluid motor (wherein referred to as a pump or pump-motor) the power transfer means driving the rotor in rotation is also the fluid being pumped and the rotor has a mechanical power take off means, such as an axial shaft or its equivalent, for the transfer the mechanical power converted in the pump-motor from the flow energy of the fluid being pumped.

The above incompressible fluid pump and pump-motor arrangements are usable with compressible fluid.

With compressible fluid, the pump may be used to compress within the unit the fluid being pumped (pump-compressor). This, in designing the rotary fluid pump, is effected by arranging the intake and exhaust regions of each cavity undulation so that the volume varying chambers decrease in volume while traversing the cavity undulation's fluid transfer region. The rotor, driven in rotation by the power transfer means, works both to pump and compress the fluid in each volume varying chamber traversing the cavity undulation's fluid transfer region before said chamber enters the cavity undulation's exhaust region.

The compressible fluid pump is also a fluid motor (pump-motor) when the pressure differential between the undulation's intake region and exhaust region acts on the rotor driving it in rotation for mechanical power output and the fluid pumping as in an incompressible fluid pump-motor. The compressible fluid pump is also a fluid motor (pump-motor) when the expansion in the cavity undulation's fluid transfer region of the high pressure compressible fluid being pumped (the power transfer means) acts on the rotor driving it in rotation for mechanical power output while pumping said fluid. With the intake region and exhaust regions in the pump's cavity undulations arranged, in designing the rotary fluid pump, so that the volume varying chambers increase in volume in their traverse of each cavity undulation's fluid transfer region then, the high pressure compressible fluid contents (acquired at the cavity undulation's intake region via the intake means there) of each volume varying chamber traversing a cavity undulation's fluid transfer region works on the rotor wave surface driving the rotor in rotation for the pumping of the fluid and for mechanical power output.

The mass flow between neighboring volume varying chambers may also be minimized when designing a compressible fluid pump by using choked mass flow conditions in the annular cavity. Choked mass flow conditions between chambers allows only a certain maximum mass flow rate between chambers, regardless their pressure difference, determined by the instant thermodynamic characteristics of the chambers' contents.

In the rotary fluid pump used also as a fluid motor (pump-motor), the rotor wave surface boundary area of a volume varying chamber increasing or decreasing in volume with traverse of the cavity undulation, is diverging or converging, respectively, with the annular cavity face surface; therefore, said wave surface boundary area has a projection area in an axial plane which in a volume varying chamber increasing in volume is located at the said chambes following partition. The axial plane of the projection area for a chamber decreasing in volume is located at said chambers leading partition. A volume varying chamber's wave surface boundary area's projection on either said axial plane is generated by the lines of intercept in said axial plane when said boundary area is completely rotated about the rotor axis through the axial plane. The fluid, compressible or incompressible, is the power transfer means the pressure of the fluid in each volume varying chamber, increasing or decreasing in volume, acts on the chamber's projection area imposing a moment to the rotor about its axis. The sum of the volume varying chamber's fluid effected rotor moments drives the rotor in rotation to pump the fluid and supply mechanical energy to outside the pump-motor via power take-off means such as a rotor shaft. With the incompressible fluid pump, the volume varying chambers always communicate directly with the intake or exhaust means while varying in volume; therefore, the fluid pressure at the intake means effects the rotor moment. The fluid pressure per unit mass of an incompressible fluid flow is generally referred to as the fluid's flow energy or flow work available. The difference in pressures between the intake and exhaust means of the incompressible pump-motor indicates the amount of fluid flow work consumed in the pump-motor to pump the fluid and generate the torque at the power take-off means.

Compressible fluid can be used in place of the incompressible fluid as the power transfer means in an incompressible pump-motor with proper intake and exhaust means. In the compressible fluid pump-motor wherein the volume varying chambers' volumes increase while they're traversing and completely within a cavity undulation's fluid transfer region, the intrinsic pressure of the fluid contents of each chamber in the fluid transfer region imparts a moment to the rotor driving it in rotation about its axis. That is, the fluid's pressure in each volume varying chamber in a cavity undulation's fluid transfer region acts on the chamber's wave surface boundary area projection in the axial plane at said chamber's following partition imparting a moment to the rotor.

In the rotary fluid pump used also as a fluid compressor (pump-compressor), the rotor is driven by the power transfer means and with rotor rotation, the volume varying chambers traversing and completely within a cavity undulation's fluid transfer region decrease in volume compressing their fluid contents. The area projection on the axial plane at the leading partition of each volume varying chamber traversing the fluid transfer region is acted on by the pressure of the chamber's fluid contents, imparting a moment to the rotor opposing its (direction of) rotation; therefore, also the rotor rotation effected volume decrease of the volume varying chambers and the pumping of the fluid, i.e. the continued compression of said chamber's fluid contents, and the volume varying chambers' transfer of fluid from the intake means through the fluid transfer region to the exhaust means in the cavity undulation. The power transfer means supplies the necessary torque from outside the rotary fluid pump to overcome the sum of said opposing rotor moments generated by the pressures of the volume varying chambers' fluid contents while said chambers decrease in volume in the annular cavity, and to continue rotor rotation for the continuous compression of the fluid being transferred from the annular cavity's intake means to its exhaust mean with said rotor rotation.

Because of the gaps, the wear of the parts within the annular cavity of pumps of the invention is negligible. In the rotary fluid pump used as a pump, a pump-compressor, or pump-motor, the work loss incurred if wiping abutment were extant between the annular cavity's relatively moving parts is replaced by the much smaller loss in work ability due to the drop of pressure in the volume varying chambers and/or the decrease in fluid displaced consequent the mass flow between the gaps.

The following are explanations of a few terms used in the description.

The terms "axial motion" and "axially directed motion" means to have all points on the moving element describe loci of points that are axially oriented.

The terms "axial orientation", "axially oriented" and "axially" mean to be oriented in a plane containing the rotor axis or in a slightly displaced parallel plane or a slightly askew plane to a rotor axis containing plane. It also means to be in a space or occupy space bounded by such planes.

The term "(in)close proximity" means to be very close together without abutting. Typically the close proximity of the partitions edge surfaces to the annular cavity surfaces towards which they extend in present designs will range from a few ten-thousandths of an inch to one to three thousandths of an inch. The actual distance of the "close proximity" will vary due to the variation in the rotor cam fluid film thickness with location, rotor rotation rate, the precision of the partitions low friction bearings and of course general tolerances allowed in construction.

The term "edge surface" (partitions's) means, beside a single surface as the curved surfaces in the illustrations, also edge surfaces i.e. a plurality of surfaces as in a pump with an annular cavity and partitions with a polygonal and/or multicurved profile where the partition "edge surface" in the annular cavity means all of its edge surfaces in the annular cavity. The "edge surface" also means the plurality of surfaces comprising the edge surface as when said surface has lengthwise steps, corrugations or the like as might be used to further restrict mass flow or form shock waves.

The term "following partition" refers to a volume varying chambers' last partition past an annular cavity point in direction of traverse.

The term "intercept line" or "line of intercept" refers to the line formed by (and at) the intersection of two planes.

The term "leading partition" refers to a volume varying chambers' first partition past an annular cavity point in direction of traverse.

The terms "mating", "mating surfaces" and "mate" means that the spatial configuration of a surface to the surface it "mates" is such that relative motion required between the two surfaces is freely allowed while the surfaces are very close together, generally at a constant distance. It is usually at the mating surfaces that seals are extant. A seal is on one of the mating surfaces with wiping abutment with the other of the mating surfaces.

The term "pivot point" (partition's) refers to the point in the pump where a bisecting axial plane of the partition intersects the partition's axis of rotation in its slot.

The term "proximal surface", (a volume varying chamber partition's) is the partition's boundary surface of the volume varying chamber.

The terms "pump", "fluid pump" or "rotary fluid pump" herein means a fluid transfer device and such devices, while always intrinsically a fluid pump, might additionally be designed for use as fluid driven motors, fluid motors driven by fluid expansion therein, and fluid compressors.

The term "rotor axis" means the axis of rotor rotation.

The terms "seal" and "seal means", keeping in the spirit of the invention, is modified from the conventional meaning to include mass flow limiting means where their use is operatively possible. Seals between mating surfaces may be other than absolute seals. Seals in the pump at the perimeter surface(s) of the rotor wave surface mating the casing annular cavity surface(s) at the rotor may simply be mass flow limiters which allow some passage of high pressure fluid mass. This is done to avoid the seal wear and work loss that would result with use of effective positive type wiping seals.

The term "wedge element" refers to small annular cavity (volume) segment a a specified annular cavity location which is bounded on its ends by axial planes displaced a small increment angle from each other and said increment angle is constant regardless a wedge element's annular cavity location. Missing the vertex portion extending to the rotor axis, eedge elements actually have truncated wedge shapes.

FIGS. one through seventeen portray a compressible fluid pump version of the invention for use as a compressor or a fluid motor with internal expansion and having two cavity undulations in its annular cavity. It is first viewed as a fluid compressor. The rotor has a cylindrical like shape and is mounted in a cylindrical like cavity in the casing for rotation. The rotor has intake apertures and the casing has an intake channel and an intake port arranged to allow the continuous flow of fluid from outside the pump to the annular cavity's intake regions. The rotor has exhaust apertures and the casing has an exhaust channel and an exhaust port arrange to allow the continuous expulsion of fluid from the annular cavity's exhaust regions to outside the pump. The intake and exhaust means of the pump as a compressor are respectively the exhaust and intake means of the pump as a motor. The annular cavity's boundary surfaces are the rotor wave surface and the casing face surface and said boundary surfaces are lateral to one another along the rotor axis. Each partition is mounted in a partition assembly which in turn is mounted in one of the circumferential spaced, axially oriented casing slots. The pump's rotor has a rotor cam channel which is an open channel circumferential the rotor axis and radially interior the annular cavity. The rotor cam means is a pair of cam surfaces each, one an undulating continuous side wall of the rotor cam channel. The partition assembles supply lubricant to the rotor cam means. Each partition assembly in the pump has a cylindrical like extension with closed end in the rotor cam channel and open end in the assembly communicating with lubricant supply channels therein. Said extension has small opening through which lubricant is projected into the cam channel for the cam surfaces therein. In the pump a portion of each partition extends into the cam channel and has edge surfaces to interact hydrodynamically with the rotor cam surfaces for control of the partition's pivotal movement from its slot in the annular cavity.

In the pump of FIG. one, casing sections 00 and 200 are retained together by the washer-nut 215 and tie bolt 6 combination. In the casing cavity and mounted for low friction rotation in bearings is rotor 100 which is cut with reference to lines I—I of FIG. four. Cylindrical surface 7 of casing section 00 mates the outer cylindrical surface 103 of the rotor. The rotor has shafts 101 and 102 extending from the rotor to outside the casing through mating casing openings 1 and 201, respectively, are, in the instant embodiment, the power transfer means with which the rotor is driven in rotation to pump (displace) and compress the fluid 50. Shown in the figure is the annular cavity 9 formed between the rotor wave surface 107 and the casing face surface 207 and a volume varying chamber 8 which is located in the exhaust region of an annular cavity undulation 60. The face surface has a portion 206 extending laterally to the rotor at the inner diameter of the annular cavity. Surface 206, the surface part of the face surface 207 extending to the inner perimeter of to the rotor, becomes the face surface's inner perimeter boundary surface 209 where mated by the inner perimeter boundary surface 104 of the rotor. The face surface 207 has an outer portion that when mated by the rotor wave surface's outer perimeter boundary surface 120 is the face surface's outer perimeter bounday surface 208. The rotor's inner perimeter boundary surface 104 has seal means 106 and its outer perimeter bounday surface 120 has seal means 105. Shown, in its broken away partition assembly 300, is a partition 301 extending into the annular cavity towards the rotor wave surface 107. Each partition assembly 300 is fastened in its retaining slot 210 in the casing section 200 by retainers 302 in casing channels 212. Each assembly 300 is retained to casing section 00 by a fastener 302 in a threaded casing channel 10. Shown in profile is the rotor's open cam channel 117 with its cam surface side walls 118 and 119. The cylindrical element 303 of the partition assembles supply lubricants to the rotor cam surfaces 118 and 119 for their hydrodynamic operative engagement with the partitions. Each partition assembly is supplied with lubricant for both itself and the rotor cam surfaces via a casing lubricant channel 203 which connects through its port 202 to a lubricant supply outside the pump. The remaining lubricant supply circuit shown in casing section 200 is the return channel 204 in which excess lubricant is accumulated and drained from the pump via the channels 225 each with an exit port 226 to outside the pump.

The porting plate 108 of the rotor has cylindrical extension 110 into the casing section 00 cylindrical cavity behind the rotor. The cylindrical extension 110 divides the cavity into two annular cavities, 3 and 4, with cavity 4 interior cavity 3 with respect to the rotor axis. In topic pump-compressor annular cavity 3 is casing intake channel 3, and annular cavity 4 is casing exhaust channel 4. The term "annular cavity" is hereafter restricted to mean the annular cavity 9 of the pump.

Shown is the fluid 50 which is both pumped and compressed in the pump. The intake circuit for the continuous supply of fluid 50 from outside the pump to the volume varying chambers in the intake regions of the annular cavity is via intake port 2 of intake channel 3, both in casing section 00. Intake channel 3 communicates with each rotor intake aperture 112 through a porting plate aperture 111. Each rotor intake aperture 112 communicates with the volume varying chambers in a cavity undulation via its rotor wave surface exit 113 in the intake region. The circuit for the continuous expulsion of the compressed fluid 50 from the volume varying chambers in the exhaust region of each cavity undulation is via said chambers communication with the region's rotor exhaust aperture 115 (formed in part by the rotor and the rotor porting plate 108) through its rotor wave surface entry 114. The exhaust aperture 115 communicates with casing exhaust channel 4 through a porting plate aperture 116 and the casing exhaust channel 4 has exhaust port 5 to outside the pump. Illustration of fluid 50 is discontinued in rotor exhaust channel 114 to facilitate portrayal of other pump elements and deleted, for clarity, from the other figures of the topic invention embodiment.

FIG. two is a side portrayal of the pump rotor element 100 which is cut with reference to lines II—II of FIG. three and the rotor porting plate's cylindrical extension 110 and the rotor shafts 101 and 102 are broken away. Shown in profile are the concave nature of the rotor wave surface 107 and its two wave surface undulations 170. Each wave surface undulation 170 is a boundary surface of a cavity undulation 60 of the annular cavity 9 and it is responsible for the wave like variation in volume (as indicated by wedge elements) from end to end of its respective cavity undulation. Also in profile is cam channel 117 with its side walls, the undulating cam surfaces 118 and 119, which in the pump, operatively engage the partitions 301 for their pivotal motion from their slots into the annular cavity. Shown also is the inner perimeter boundary surface 104 which mates to inner perimeter boundary surface 209 of surface 206 which is an extension of the face surface 207 to the rotor. The outer perimeter boundary surface 120 of the rotor is shown in profile. Surface 120 mates the outer perimeter boundary surface 206 of casing face surface 207. Shown is exit 113 of the intake aperture 112 in a rotor wave surface undulation 170. In the pump, exit 113 is at the intake region of the cavity undulation 60 at the wave surface undulation. The communication of intake aperture 112 with the radial exterior of the rotor porting plate cylindrical extension 110 via the intake aperture 111 of the rotor porting plate 106 is shown. The rotor wave surface undulation's entry 114 to an exhaust aperture 115 of the rotor (formed in part by the rotor and the rotor porting plate 108) is shown along with the exhaust aperture's communication with the radial interior of the rotor porting plate cylindrical extension via an exhaust aperture 116 of porting plate. In the pump, entry 114 is at the exhaust region of the annular cavity undulation 60 at said wave surface undulation.

FIG. three is a wave surface end view of the pump rotor 100. The below discussions are with relation a circumferential traverse over the wave surface of the figure. The figure illustrates the area variations of the inner perimeter boundary surface 104 and the outer perimeter boundary surface 120 to the rotor wave surface 107, and thus the change of location of the mating face surface's perimeter boundary surfaces 209 and 208 respectively. The divergence of boundary surfaces 104 and 120 from each other and then convergence with each other reflects the rotor wave surface area variation from a minimum to a maximum then back to a minimum area. Said area variation is a wave surface undulation 170. In the pump, the increase in area of a rotor wave surface undulation 170 reflects, a divergence of the wave surface from the annular cavity face surface and a consequent increase in volume of the annular cavity and the decrease in area of wave surface undulation 170 reflects the wave surface convergence with the annular cavity face surface and a consequent decrease in volume of the annular cavity. Said increase and decrease in annular cavity volume is the annular cavity undulation 60 at the rotor wave surface undulation 170. Shown are the two wave surface undulations 170 of the rotor wave surface and the divergence and convergence of the boundary surfaces 104 and 120 reflecting the volume increase and decrease of the annular cavity undulations 60 in the assembly. Shown at each wave surface undulation 170, is an intake aperture 112 with its exit 113. Axial planes through the curved length extremes of exit 113 in each wave surface undulation 170 are, in the assembly, the end boundaries of the intake region of the annular cavity undulation formed at each wave surface undulation. Shown is the exhaust port 115 with its entry 114 at each wave surface undulation 170. Axial planes through the curved length extremes of entry 114 in each wave surface undulation 170 are, in the assembly, the exhaust region end boundaries of the annular cavity undulation 60 formed at each said rotor wave surface undulation. Each rotor wave surface area segment where the perimeter boundary surfaces, 104 and 120, are closest to each other on the rotor (i.e. where the wave surface has the least area) is the rotor boundary surface (i.e. the wave surface boundary) of a sump region of the pump's annular cavity. The wave surface segment that is boundary for each annular cavity sump region is located between the intake means exit 13 of one wave surface undulation and the exhaust means entry 114 of the neighboring wave surface undulation. At the midpoint of an annular cavity sump region, the neighboring rotor wave surface undulations 170 join and in the pump the cavity undulation 60 formed at said undulations join. The end boundaries of each annular cavity sump region are the boundary of the exhaust region at the end segment of one cavity undulation and the boundary of the intake region of the neighboring cavity undulation at its beginning segment. In the figure, the area between the intake means exit 113 and the exhaust means entry 114 of each wave surface undulation 170 is the wave surface's boundary of the fluid transfer region of the pump's cavity undulation 60 formed at said wave surface undulation in the annular cavity. A cavity undulation fluid transfer region's end boundaries are the most central end boundary of the intake region and the like end boundary of the exhaust region of the cavity undulation. Shown are seal means 105 and 106 of perimeter boundary surfaces 120 and 104 respectively.

FIG. four is a wave surface end view of the rotor 100 mounted in casing section 00. It shows the annular cavity 9 (with face surface removed) with the plurality of partitions 301 in their extension into the annular cavity towards the wave surface 107. The partitions are cut at the annular cavity's face surface; i.e. where they exit their slots. Shown are the two annular cavity undulations 60, each formed at and by (with the other cavity surfaces) one of said rotor wave surface undulations. Shown is the annular cavity 9 with its plurality of circumferential spaced volume varying chambers 8, each formed between consecutive pairs of partitions 301. $A_1$ and $A_2$ each designate a sump region of the annular cavity 9 and the approximate locations of minimum annular cavity volumes. $B_1$ and $B_2$ each designate, approximately, a location of greatest annular cavity volume and an initial portion of a fluid transfer region of the annular cavity 9. Between the midpoints of the sump regions at $A_1$ and $A_2$ and including the fluid transfer region $B_1$ is one annular cavity undulation 60. Between the midpoints of the sump regions at $A_1$ and $A_2$ and including the fluid transfer region $B_2$ is the other annular cavity undulation 60. A horizontal axial plane bisecting the annular cavity would separate the two annular cavity undulations 60 where they joined at the sump regions' midpoints. Shown is the volume variation with cavity location of the volume varying chambers. Said chambers' vary from minimum volume, when located in the sump region at the beginning of a cavity undulation, to maximum volume, when located in the beginning of the cavity undulation's fluid transfer region, then to minimum volume again in the sump region at the end of the cavity undulation. Shown are the intake regions of the annular caviy, one at each cavity undulation 60 and each with a rotor wave surface exit 113 from the region's rotor intake aperture 112 and the volume varying chambers' communication with the exit 113 in each intake regions. Shown are the exhaust regions of the annular cavity, one at each cavity undulation 60 and each with a rotor wave surface entry 114 to the region's rotor exhaust aperture 115 and the volume varying chambers communicating with the entry 114 in each exhaust region. Shown are tie rods 6 of casing section 00. Each said tie rod in the assembly extends through a casing channels 236 and is joined by the washer-nut set 215. Also shown are the threaded retaining channels 10 of casing section 00 for securing partition assembles 300 thereto.

FIG. five is an enlarged oblique view of a partition assembly 300 with its two major sections 312 and 311. Section 312 contains lubricant channeling and lubricant spray element 303. The section 311 contains the partition 301 in its slot 305 wherein it is mounted for low friction pivotal motion. In the pump: each partition assembly is retained in an axially oriented slot 210 of casing section 200; each partition slot 305 has an axial orientation; and the pivotal motion of partition 301 from the partition assembly into the annular cavity is axial. The major portions of the assembly are retained together by screws 307 and each assembly has a channel 306 through which, in the pump, a threaded fastener 302 extends into a threaded channel 10 of casing section 00 for the assembly's retention thereto. The surface 327 is the partition assemble's continuation of the annular cavity's face surface 207 as is surface 326 the continuation of surface 206. In the pump, extension 304 of the partition 301 extends into the rotor channel 117 for engagement with its the cam surface side walls 118 and 119.

FIG. six is an enlarged oblique view of a partition assembly's spray element section 312. Shown are the assembly section's threaded channels 308 for fasteners 307 and lubricant channels 313. In the pump, an assembly's lubricant channels 313 connects its lubricant spray element 303 to a casing lubricant supply channel 203 for the continual supply of lubricant to the rotor cam channel 117 through the small openings 322 in the walls of the spray element. Shown also is the the assembly section's cylindrical extension 309 which, in the assembly, extends into the partition slot 305 of assembly section 311. The partition with its low friction bearing 310 is retained on cylindrical extension 309 for its pivotal extension from its slot.

FIG. seven is an enlarged oblique view of a partition 301 illustrating the edge surfaces 314 and 315 of the partition extension 304 which in the pump interact with cam surfaces 118 and 119, respectively, of the rotor cam channel 117. Also shown is the partition edge surface 316 which in the pump extends towards, without abutting, the rotor wave surface 107 and forms therewith an (orifice) gap connecting the volume varying chambers 8 in the annular cavity 9 on either side of the partition.

FIG. eight is an enlarged oblique portrayal of the partition retaining section 311 of the partition assembly with the partition removed. Shown is the slot 305 in which the partition 301, with low friction bearing 310, is mounted for pivotal motion on cylindrical extension 309 of assembly section 312.

FIG. nine is a broken away porting plate end view of the rotor. The rotor porting plate 108 is broken away illustrating: a rotor wave surface entry 114 of a rotor exhaust aperture 115; the partial formation between the rotor and rotor porting plate 108 of an exhaust aperture 115; and a porting plate's aperture 116, which is the exhaust aperture's means of communication in the pump with casing exhaust channel 4 interior the rotor cylindrical extension 110. Shown also is a rotor intake aperture 112 with its rotor wave surface exit 113 and a rotor porting plate aperture 111 which is said rotor intake aperture's means of communication with casing intake channel 3, in the pump. Shown are the fasteners 109 securing to the rotor its porting plate 108.

FIG. ten is a broken away and section portrayal of casing section 200 cut at a slot 210 with reference to line X—X of FIG. eleven. Illustrated in profile are a partition retaining slot 210, a casing lubricant return channel 204, a lubricant supply channel 203 with its inlet port 202, and retainer channels 212 through which (in the pump) fasteners 302 extend retaining a partition assembly 300 in the casing slot 210. Shown in profile is the face surface 207 of the annular cavity with its outer perimeter boundary surface 208 and its surface portion 206 which in the pump extends to the rotor and has inner perimeter boundary surface 209 on it.

FIG. eleven is a broken away annular cavity end view of the casing section 200. It illustrates a portion of the circumferential spaced, axially oriented, partition assembly retaining slots 210 and the channels therein. Also shown are the face surface 207 with its portion 206 along with its outer perimeter boundary surface 208 and its inner perimeter boundary surface 209. Also shown are the retainer channels 236 through which tie rods 6 extend.

FIG. twelve is similar to FIG. eleven but with the partition assembles 300 mounted in their slots 210 in casing section 200. Shown are the partitions 301 mounted in and extending from in their slots 305 and from the face surface 207 as they would extend into the pump's annular cavity. In the pump's annular cavity, a volume varying chambers 8 is between and circumferential bounded by the partitions 301. Also shown are the partitions extensions 304 and the partition assembly's lubricant spray extension 303. Both in the pump extend into the rotor cam channel 117.

FIG. thirteen is an oblique section broken away view of the casing section 200 illustrating the extension of partition 301 from its slot 305 and from the face surface 207 as it would extend in the pump's annular cavity 9 with a volume varying chamber 8 on either side therein. Shown in the casing are lubricant return channels 204 and 225 with return port 226 to outside the pump.

FIG. fourteen is a rotor end view of the casing section 00 broken away. Shown are: tie rods 6 of the casing retaining assembly; threaded channels 10 for partition assembly retainers 302; the opening 1 through which rotor shaft 101 extends; and cylindrical surface 7 which mates the rotor cylindrical surface 103 in the pump.

FIG. fifteen is an enlarged section broken away representational profile view of the annular cavity of the pump taken with reference to line XV-of FIG. four. A circumferential (profile) view into a volume varying chamber 8 in annular cavity 9 (and the annular cavity's cavity undulation 60) is shown bounded by the partition 301 and the annular cavity boundary surfaces, the rotor wave surface's undulation 170 and the face surface 207 with surface portion 206 extending to the rotor. The volume varying chamber of this figure has a near maximum volume.

FIG. sixteen is a portrayal as in FIG. fifteen but taken with reference to line XVI-of FIG. four. The volume varying chamber in this drawing has a near minimum volume.

FIG. seventeen is a portrayal as in FIGS. fifteen and sixteen but taken with reference to line XVII-in FIG. four and greatly enlarged. Shown with great exaggeration is the gap, dimensionally denoted as "X" between the edge surface 316 of partition 301 and the rotor wave surface 107; i.e. the annular cavity surface towards which it extends. In the pump partition edge surface 316 extends towards without abutting the annular cavity surface toward which it extends and is maintained in close proximity to said annular cavity surfaces in the sump and fluid transfer regions of the annular cavity. Said partition extension is maintained by the variation in partition's pivotal axial extension from its slot into the annular cavity during rotor rotation and its consequent traverse of the annular cavity. The variation in pivotal extension of the partition into the annular cavity is effected by the operative engagement, through hydrodynamic interaction, between the edge surfaces 314 and 315 of its extension 304 (into the rotor cam channel 117) and the cam surfaces 118 and 119 respectively of the rotor cam channel. In the pump the gaps, otherwise termed channels or orifices, formed by the partition edge surfaces in the annular cavity and the rotor wave surface permits communication between consecutive volume varying chambers at the rotor wave surface. It is through the gaps that fluid flows between the volume varying chambers in the annular cavity sump and fluid transfer region(s).

Looking to FIG. four for discussion of the pumps operation, and reviewing, the regions $A_1$ and $A_2$ are the sump regions in the annular cavity 9. Said sump regions are where the volume varying chambers have minimum volume in the annular cavity and where the end of one annular cavity undulation 60 joins with the beginning of the next (its neighboring cavity undulation). The annular cavity's sump regions $A_1$ and $A_2$ are located between a cavity undulation's exhaust aperture entry 114 in the rotor wave surface and its neighboring cavity undulation's intake aperture exit 113 in the rotor wave surface. That is, each sump region of the annular cavity is bounded by and connects the end of the exhaust region (at its axial boundary plane) of one annular cavity undulation 60 to the beginning of the intake region (at its axial boundary plane) of the neighboring annular cavity undulation 60. One cavity undulation 60 of the annular cavity 9 extends between the midpoints of sump regions $A_1$ and $A_2$ and includes the fluid transfer region $B_2$ which is located between and bounded by the intake and exhaust regions of said cavity undulation. The other cavity undulation extends between the midpoints of the $A_2$ and $A_1$ sump regions and includes the $B_1$ fluid transfer region which is located between and bounded by the intake and exhaust regions of said cavity undulation.

In each annular cavity undulation 60 the area segment of wave surface undulation 170 that extends between and is bounded by the intake aperture exit 113 and the exhaust aperture entry 114 is the wave surface boundary of the cavity undulation's fluid transfer region.

In the pump's operation as a fluid compressor the rotor turns counterclockwise. Taking, with rotor rotation, a volume varying chamber (the topic chamber) in the $A_2$ sump region, said chamber while exiting said sump region enters and traverses the cavity undulation's intake region located between $A_2$ and $B_1$. The intake aperture exit 113 in the rotor wave surface between $A_2$ and $B_1$, extends the circumferential length of said intake region. During said traverse the topic chamber increases in volume and communicates with the cavity undulation's rotor intake aperture 112 through its exit 113 and thereby takes in compressible fluid 50. The topic chamber then arrives at $B_1$ in the beginning part of the cavity undulation's fluid transfer region, where it has a maximum volume on complete entry therein and no longer communicates with the cavity undulation's intake means. With further rotor rotation, the topic chamber traverses the fluid transfer region and decreases in volume with said traverse. The rotor driven in rotation by the power transfer means, it axial shafts 101 and 102, works on the topic chamber's fluid contents compressing them until the topic chamber arrives at the cavity undulation's exhaust region and traverses the entry 114 therein, of the rotor exhaust aperture 115, through which the compressed fluid is expelled from the volume varying chamber during said traverse. With further traverse the topic chamber enters the $A_1$ sump region at the end of the cavity undulation and on complete entry therein it no longer communicates with the cavity undulation's exhaust means and is again at minimum volume. With further traverse the topic chamber enters the second annular cavity undulation, which extends from the midpoint of sump region $A_1$ to the midpoint of sump region $A_2$ and includes fluid transfer region $B_2$, and repeats the fluid transfer sequences it performed in the first undulation and arrives back at its starting point in $A_1$. In design of the rotary fluid pump-compressor, the rotor wave surface in the sump regions is made to approach as closely as practical the casing's face surface to minimize the compressed fluid conveyed from the exhaust region of one cavity undulation through the sump region to the intake region of its neighboring cavity undulation by the volume varying chambers traversing therein.

The mechanical combination portrayed in FIGS. 1 through 17, while retaining all the physical elements of the combination pump-compressor embodiment already discussed, becomes in operation, in addition to a pump, an expanding fluid motor (rather then a compressor) by changing the function of some of its elements as follows. In the rotary fluid pump operation as a fluid motor (pump-motor) the rotor turns clockwise. The fluid 50 being pumped is, also the power transfer means. The rotor shafts 101 and 102 are the power take off means (and not the power transfer means). The fluid intake and exhaust paths from outside the rotary pump to the volume varying chambers in the annular cavity are the reverse of said fluid paths in the compressor. The intake circuit for the continuous supply of fluid 50 (compressible and at high pressure) from outside the pump to the volume varying chambers in the intake region of the annular cavity is via casing section 00 intake port 5 to intake channel 4. Intake channel 4 communicates with the rotor intake aperture 115 through porting plate aperture 116. The rotor has an intake aperture 115 with exit 114 in the rotor wave surface undulation 170 at each annular cavity undulation's intake region and said exit communicates with volume varying chambers in said region. The circuit for the expulsion of the fluid 50 (at a lower pressure then at the intake means) from the volume varying chambers in the exhaust region of each cavity undulation is via their communication with the rotor exhaust aperture 112 through its entry 113 in the rotor wave surface undulation 170 at said exhaust region. The exhaust aperture 112 communicates with casing exhaust channel 3 through porting plate aperture 111. The casing exhaust channel 3 has exhaust port 2 to outside the pump. The power transfer means, fluid 50, drives the rotor in rotation. The fluid's intrinsic high pressure in the each volume varying chamber which is increasing in volume while traversing a cavity undulation acts on said chambers rotor wave surface boundary area imparting a moment to the rotor about its axis. In the portrayed embodiment the volume varying chambers increase in volume in the annular cavity's intake regions (not a necessity in all designs) and in the annular cavity's fluid transfer regions until entering the exhaust region. Driving the rotor in rotation, fluid 50 effects its own transport through the pump from the pump casing's intake port to the pump casing's exhaust port while generating the rotary mechanical power output at the power takeoff means.

Looking again to FIG. four and taking a volume varying chamber in $A_2$ sump region, with rotor clockwise rotation, said chamber enters and traverses, while slightly increasing in volume, the intake region located between $A_2$ and $B_2$ in the annular cavity and having the same circumferential length as the intake aperture's exit 114. While traversing the intake region the topic chamber communicates with the rotor intake aperture 115 through its exit 114 in the rotor wave surface and thereby takes in compressed fluid 50. The topic chamber on exiting the intake region enters the cavity undulation's fluid transfer region with $B_2$ at the end portion thereof. The topic chamber, on entering completely the fluid transfer region, has a near minimum volume and no longer communicates with the intake aperture 115. With further rotor rotation, the topic chamber traverses the fluid transfer region and increases in volume with said traverse. The pressure of the expanding fluid in the topic chamber acts on the rotor driving it in rotation for mechanical power output and the rotor effected fluid transfer until the topic chamber, at maximum volume, arrives at the exhaust region of the cavity undulation wherein with its traverse the chamber decreases in volume while communicating with entry 113 of the rotor exhaust aperture 112 through which the expanded fluid 50 is expelled from the topic chamber. Exiting the exhaust region the topic chamber enters the sump region at $A_1$ and when completely therein no longer communicates with said exhaust means and is again at minimum volume. With further traverse the topic chamber enters the second cavity undulation and repeats the fluid transfer sequence it performed in the first undulation and arrives at its starting point in sump region $A_2$.

FIGS. eighteen through twenty illustrate three of the many orientations of the annular cavity boundary surfaces (i.e. annular cavity), about a line at, and perpendicular the axial plane of, a partition pivot point, available in designing a pump of the invention. That is, in designing a pump of the invention, the annular cavity profile (having a characteristic shape determined by the designer) formed in an axial plane cutting said cavity at a partition is oriented, by the designer, any portion of a complete revolution about said partition's pivot point, for the pump's annular cavity surfaces spatial orientation. Passing any axial plane through the face surface for its intercept line and as the face surface intercept line's angular reference axis taking a line which is parallel to the rotor axis, at pivot point radius therefrom and in said axial plane, the designer can vary the angle between the face surface intercept line and its reference axis through a complete circle (in the axial plane) in designing a pump of the invention for the spatial orientation of its annular cavity.

FIG. eighteen is a representational sectional broken away side view of an embodiment of the invention. Shown are annular cavity 1009 between face surface 1207 of casing section 1200 and wave surface 1107 of rotor 1100, the rotor cam channel 1117, annular cavity 1009, volume varying chamber 1008, and the annular cavity undulation 1060. The rotor wave surface 1107 is radially interior the casing face surface 1207 with which it forms the annular cavity about the rotor axis.

FIG. nineteen is a representational sectional broken away side view of an embodiment of the invention with the annular cavity 3009 formed between wave surface 3107 of the rotor 3100 and face surface 3207 of the casing section 3200 which are lateral to one another along the rotor axis as in figure one. But unlike FIG. one which has a smaller radial distance between the rotor axis and the partitions' pivot points then the smallest radius of the annular cavity, in the portrayed embodiment the partitions' pivot points are at a greater radius to the rotor axis then the greatest radius of the annular cavity. Shown also is the undulation 3060 of the annular cavity 3009.

FIG. twenty is a portrayal as in FIGS. eighteen and nineteen but with the rotor wave surface 2107 at a greater radius to the rotor axis then is the casing face surface 2207 of the annual cavity 2009 formed between the wave surface and the face surface. Indicated also is the undulation 2060 of the annular cavity 2009. The rotor cam channel 2117 is located near the perimeter boundary surface of the rotor across the annular cavity from the partitions 2301 pivot point; i.e. at the partitions greatest radii from their pivot points. The cam channel 2117 functions as previous discussed channels function.

FIG. twenty-one portrays a partition of the FIG. twenty pump. Shown are its extension 2304 which in the pump extends into rotor cam channel 2117 for operative engagement by the cam surfaces therein and edge surface 2316 which extends into the annular cavity of said pump.

FIGS. twenty-two through twenty-four portray pumps similar to the pump in FIG. one but wherein the the rotor cam channel's cam surface 118 and the partition extensions' edge surface 314 it engages hydrodynamically are functionally replaced by mechanical means that are a spring or hydraulic pressure acting on a piston abutting each partition. Said mechanical means coacts with the operative engagement between the rotor cam surface 119 and the partitions' edge surfaces 315 to displace the partitions in their slots.

FIG. twenty-two is a broken away sectional side view of a pump without a rotor cam surface 4118 or the edge surface 4314 on each of its partition extensions 4304. These elements are replaced operatively in the pump by a mechanical loading means combination at each partition and said means are a compressed spring 4317, in channel 4217, interacting through a piston 4318, also in channel 4217, with the back edge of the partition 4301 in the partition assembly 4300. In the pump each channel 4217 is common to both casing section 4200 and a partition assembly 4300 and extends far enough into the partition's slot 4305 for continuous engagement of the spring loaded piston 4318 with the partition throughout the partition's pivotal motion therein. The spring pressure applied via the piston 4318 to the partition is adjustable by set screw 4218 in the threaded portion of the channel 4217. The set screw also retains the spring and piston combination in the channel.

FIG. twenty-three is a section broken away right side view of the pump in FIG. twenty-two. Shown are set screws 4218 in the threaded end of channel 4217, the fasteners 4302 in channels 4212 retaining the partition assembles in their slots and the washer-nut 4215 on tie rod 4006.

FIG. twenty-four is a sectional broken away side view of a pump similar to that in FIG. twenty-two. Shown in the figure is its mechanical loading means used to coact with one rotor cam to displace the partitions in their slots pivotally. Said means is similar that in FIG. twenty-two but the compressed spring mechanical loading means is replaced by fluid 5319 under pressure supplied from out side the pump via port 5218 to channel 5217 and the fluid acts on the partition 5301 in its slot 5305 through the intermediate piston element 5318.

FIGS. twenty-five through thirty-five portray another embodiment of the pump invention which can be used as a reversible incompressible fluid pump and fluid driven motor. The pump's annular cavity, with an orientation similar to the pump's in FIG. eighteen, is formed by the casing face surface and the rotor wave surface and has two cavity undulations. The pump casing has a cylindrical cavity in which the cylindrical like rotor is mounted for rotation. The rotor's outer surface includes the wave surface and is otherwise generally cylindrical. The casing cavity's inner cylindrical surface includes the face surface and the partitions extend from their slots at the face surface with axial pivotal motion into the annular cavity. The partitions are mounted in partition assembles and said assembles are mounted in the casing section with the face surface. The topic pump has its partitions' pivotal extension into the annular cavity effected by a rotor cam means in the form of a rotor cam rail. The motor cam rail is a continuous rail on the rotor that is circumferential to the rotor axis and said cam rail has side surfaces, the rotor cam surfaces, which change spatial orientation about the rotor axis. With rotor rotation, the rotor cam surfaces operatively engage (hydrodynamically) the partitions. Said partitions' engagement is for: they're pivotal extension into the annular cavity; the maintenance of the gaps at their edge surfaces' in the annular cavity; and the close proximity between their edge surfaces and the surfaces towards which they extend in the fluid transfer and sump regions of the annular cavity. Lubricants are supplied to the cam rail surfaces by spay orifices in the partition assembles. The pump's rotor shafts extend through the casing's two end caps. Each end cap has either intake or exhaust fluid channeling to outside the pump and contains a bearing between the rotor and casing.

FIG. twenty-five is a sectional side view of the pump with the rotor shafts 6101 and 6102 broken away and the rotor cut with reference to lines XXV—XXV of FIGS. twenty-six and twenty-nine. When the topic pump is used only as a pump, rotor shafts 1601 and 6102 are the power transfer means to a power source outside the pump driving the rotor in rotation to displace the fluid 50. When the pump is also a fluid driven motor (a pump-motor), fluid 50 (i.e. the fluid with its flow energy) is the power transfer means used to drive the rotor in rotation and thereby displaces itself (the fluid) through the pump while making rotary power available to outside the pump via the power take-off means, rotor shafts 6101 and 6102. Shown in FIG. twenty-five is cylindrical casing section 6200 with axially oriented circumferential spaced slots 6210 in its wall for retaining with fasteners 6302 partition assembles 6300. The pump casing also has exhaust end cap 6000 and intake end cap 6600 sections. The pump's casing sections 6000,6200 and 6600 with the rotor 6100 within, are retained together by fasteners 6606. Rotor element 6100 is mounted for rotation in the casing cylinder and has the wave surface 6107 with two wave surface undulations 6170, in its outer surface which is otherwise cylindrical. The portion of the inner cylindrical surface of casing section 6200 across from the rotor wave surface 6107 is the face surface 6207. Between the face surface 6207 and the rotor wave surface 6107 is the rotary fluid pump's annular cavity 6009 with its two cavity undulations 6060, one at each wave surface undulation 6170. The cylindrical surface 6130 is the perimeter boundary surface at the perimeter of the wave surface 6107 nearest the rotor cam rail and the portion of the casing section 6200 inner cylindrical surface to which it mates is perimeter boundary surface 6209. The other perimeter boundary surface of the rotor wave surface is cylindrical surface 6120 and the casing inner cylindrical surface it mates is perimeter boundary surface 6208. Shown in the figure are partitions 6301 extending into a cavity undulation 6060 of the annular cavity 6009 and the volume varying chambers 6008 formed between consecutive partitions therein. The rotor cam means is the rotor cam rail 6127 which operatively engages the partitions 6301 at the open end channels 6320 of their assembles 6300. Lubricant from outside the pump is supplied to the rotor cam rail via the casing lubricant inlet ports 6203 of the inlet channels 6202 which communicate with the lubricant channels of the partition assembles which complete the lubricant circuit. Lubricant is removed from the pump via drain channel 6204 and channel 6225, with its casing exit port 6226. The circuit for the intake of fluid 50 by the volume varying chambers in the intake region of a cavity undulation 6060 from outside the pump is via the intake port 6605 of intake channel 6604 in casing intake end cap and the communication of intake channel 6604 with the rotor' intake aperture 6115 which has exit 6114 in rotor wave surface undulation 6170 (the wave surface boundary of the cavity undulation) which communicates with the volume varying chambers in said intake region. The circuit for the expulsion of fluid to outside the pump from the volume varying chambers in the exhaust region of an annular cavity undulation 6060 of the pump is via the entry 6113, in the wave surface undulation 6170 at said exhaust region, of exhaust aperture 6112 and the communication of exhaust aperture 6112 with the exhaust channel 6003 with its exhaust port 6002 to outside the pump both in exhaust end cap 6000. The portrayal of fluid 50 in the figure it discontinued in the rotor intake aperture 6115 and exhaust aperture 6112 so other essential pump details can be shown. Fluid 50 is not portrayed in the remaining figures.

FIG. twenty-six is an exhaust end cap end view of the rotor element 6100 with section of rotor shaft 6101. Shown are: the rotor cam rail 6127 with inner and outer undulating circumferential cam surfaces 6128 and 6129 respectively, which operatively engage the partitions for their pivotal movement; the rotor perimeter boundary surface 6120 in profile; and the rotor exhaust apertures 6112 where, in the pump, they exit the rotor to end cap exhaust channel 6003.

FIG. twenty-seven is a right side view of rotor 6100 in FIG. twenty-six with the rotor shafts 6101 and 6102 broken away. Shown is an undulation 6170 of rotor wave surface 6107 with its cylindrical perimeter boundary surfaces 6120 and 6130. In the pump each wave surface undulation 6170 is a boundary surfaces of and forms with the casing face surface 6207 an annular cavity undulations 6060. Shown are: a side view of the rotor cam means, cam rail 6127; the entry 6113 of the exhaust aperture 6112 in the wave surface undulation 6170, which in pump is at the exhaust region of the cavity undulation 6060 formed at said wave surface undulation; and the exit 6114 of the intake aperture 6115 in the wave surface undulation 6170 which in the pump is at the intake region of said cavity undulation 6060. The rotor wave surface undulation's area segment between the exit 6114 and entry 6113 is, in the pump's annular cavity undulation 6060 at said wave surface undulation, where said wave surface undulation is farthest diverged from the casing face surface and is a boundary surface of the cavity undulation's fluid transfer region. In the fluid transfer region: the volume varying chambers have a maximum volume; the volume of the volume varying chambers do not vary while completely therein; the partitions therein are not pivotally displaced; and there is no direct communication between the intake region on one side and exhaust region on the other side of the fluid transfer region possible, only indirect communication in the form of minuscule fluid flow at the region's gaps.

FIG. twenty-eight is a view of the rotor in FIG. twenty-seven rotated a quarter turn and shows a part each of the two wave surface undulations 6170. At one rotor wave surface undulation 6170 is shown the entry 6113 of the exhaust aperture 6112 which is at the exhaust region of the pump's cavity undulation 6060 at said wave surface undulation. In the drawing the exhaust aperture 6112 exits the rotor's left end. Shown is the second rotor wave surface undulation 6170 neighboring the above discussed wave surface undulation. At the second rotor wave surface undulation 6170 is shown the exit 6114 of the intake aperture 6115 which is at the intake region of the pump's cavity undulation 6060 at said second wave surface undulation. At the midpoint of the minimum rotor wave surface area segment which is located between the exit 6114 in one wave surface undulation 6170 and entry 6113 in the second wave surface undulation 6170, is where said undulations 6170 and their respective cavity undulations 6060 in the pump join. Said area segment is the wave surface boundary area of a sump region of the annular cavity. In the pump the sump regions' wave surface boundary segments of areas are very close to the face surface. In the sump regions: the volume varying chambers have a minimum volume; the volume of the volume varying chambers do not vary while completely therein; the partitions therein are not pivotally displaced; and there is no direct communication possible between one cavity undulation's exhaust region and its neighboring cavity undulation's intake region at said sump region, only indirect communication in the form of minuscule fluid flow at the gaps in the region.

FIG. twenty-nine is a right side end view of the rotor FIG. twenty-eight. Shown are the entries of the rotor intake apertures 6115 which in the pump are at the intake end cap channel 6604.

FIG. thirty is a broken away view of the sump channel end of the casing section 6200. Shown is the sump channel 6204 which in the pump is also the open channel circumferential the rotor axis in which the rotor cam rail 6127 travels in co-axial rotation. Shown are the circumferential space partition assembly mounting slots 6210. Each said slot in the pump retains a partition assembly 6300. In the pump the partitions 6301 extend into the annular cavity with pivotal axial motion from their slots 6305 in their assembles 6300 and from the casing face surface 6207. Shown is one partition assembly 6300 retained in its casing slot 6210 with its partition 6301 extending axially from the casing face surface 6207 as it would in the pump. The portion of the partition 6301 in the partition assembly open channel 6320 has a notch 6321 through which, in the pump, the rotor cam rail 6127 travels with operative engagement effecting said partitions' pivotal motion.

FIG. thirty-one is a broken away section view of the casing section 6200 taken with reference to line XXXI—XXXI of FIG. thirty.

FIG. thirty-two is an enlarged oblique view of a partition assembly 6300 of the pump. Shown are its major parts, the lubricant spray section 6312 and the partition slot section 6311 with partition 6301 in place and at maximum pivotal displacement in its slot 6305 from the partition assembles face surface part, surface 6327. The assembly is retained together by screws 6307. Shown is the rotor cam rail channel 6320 (also called the open channel) of the assembly with the partition's portion therein with the partition's notch 6321. In the pump, partition notch 6321 is operatively engaged by the rotor cam rail 9127 for the partitions pivotal movement in its assembly slot.

FIG. thirty-three is an enlarged oblique side view of the lubricant spray section 6312 of the partition assembly 6300 showing the lubricant channels 6313 which communicate between the casing lubricant supply channel 6202, which supplies lubricant to the assembly from outside the pump, and the lubricant spray orifices 6322 through the walls of the assembly's rotor cam channel 6320. The lubricant spray orifices 6322 supply lubricant to the cam surfaces 6128 and 6129 of the rotor cam rail 6127. Also shown is cylindrical extension 6309 on which partition 6301 with low friction bearing 6310 is retained in the assembly for low friction pivotal motion.

FIG. thirty-four is an enlarged side oblique view of the partition slot section 6311 of the partition assembly 6300.

FIG. thirty-five is an enlarged side oblique view of the partition 6301. Shown is the notch 6321 through which the rotor cam rail 6127 travels in operative engagement in the pump. In the pump said partition notch edge surface 6323 is hydrodynamically engaged by the cam surface 6128 of the rotor cam rail 6127, and notch edge surface 6324 is engaged in like manner by the rotor cam rail cam surface 6129. Shown also are the partition edge surface 6316 which in the pump extends towards the rotor wave surface. In the assembly the partition with bearing 6310 is fitted to cylindrical extension 6309.

In the rotary fluid pump used solely to displace fluid, reversing the direction the rotor is driven in rotation by the power transfer means i.e. the rotor shafts 6101 and 6102, reverses the direction the of fluid displacement. The intake means and exhaust means with rotor rotation in one direction become on reversing the direction of rotor rotation, respectively the exhaust and intake means. In the rotary fluid pump used also as a reversible fluid driven motor, reversing the function of the intake and exhaust means by changing the direction of flow to and from the pump of the power transfer means, the fluid 50, reverses the direction of rotor rotation, i.e. reverses the rotation direction of the powder take-off means, rotor shafts 6101 and 6102.

What I claim is:

1. A rotary fluid pump additionally used as a fluid motor having:
   a casing;
   a rotor mounted for rotation in the casing;
   a power transfer means to outside the device;
   a power take-off means to supply mechanical power to outside the pump;
   the rotor driven in rotation in the casing by the power transfer means;
   an annular cavity formed between the casing and the rotor about the rotor axis;
   a wave surface on the rotor about the rotor axis which is a boundary surface of the annular cavity and the circumferential extent of the rotor wave surface comprised of at least one rotor wave surface undulation;
   a face surface on the casing about the rotor axis which is a boundary surface of the annular cavity and across the annular cavity from the rotor wave surface and facing it;
   at least the rotor wave surface and the casing face surface as the boundary surfaces of the annular cavity;
   a cavity undulation formed at each rotor wave surface undulation at the annular cavity with said rotor wave surface undulation the rotor wave surface's annular cavity boundary surface of said cavity undulation;
   the casing with a plurality of slots which are axially oriented and circumferential spaced about the rotor axis and open to the annular cavity at the face surface;
   a partition mounted in each of the casing slots for pivotal, axially directed motion therein and extension therefrom into the annular cavity;
   a cam means on the rotor which is circumferential to the rotor axis and outside of the annular cavity;
   the rotor cam means operatively engage a portion of each partition and thereby pivotally position it in its slot and in extension therefrom into the annular cavity;
   a plurality of circumferential spaced volume varying chambers formed in the annular cavity by the partitions with a volume varying chamber formed between consecutive partitions in the annular cavity;
   a cyclic volume variation between minimum and maximum volume in each volume varying chamber with rotation of the rotor in the casing and the consequent traverse of each cavity undulation of the annular cavity by the volume varying chambers;
   an intake region in each cavity undulation;
   intake means for the transfer of fluid from outside the rotary fluid pump to the volume varying chambers in the intake region of each cavity undulation;
   an exhaust region in each cavity undulation;
   exhaust means for the transfer of fluid contents of the volume varying chambers in the exhaust region of each cavity undulation to outside the rotary fluid pump;
   a fluid sump region in the annular cavity where the ends of neighboring cavity undulations join and each said fluid sump region extends between the exhaust region in one said neighboring cavity undulation and the intake region in the other said neighboring cavity undulation;
   a fluid transfer region in each cavity undulation between the intake region and the exhaust region of the cavity undulation;
   the partitions' edge surfaces in the annular cavity extended towards the annular cavity surfaces without abutting the annular cavity surfaces towards which they extend;
   the edge surfaces of the partitions in each cavity undulation fluid transfer region and each annular cavity sump region maintained in close proximity to the annular cavity surfaces towards which the extend;
   the rotor rotation effected volume varying chambers' traverse of each cavity undulation convey fluid from the intake means in the cavity undulation's intake region across the cavity undulation's fluid transfer region to the exhaust means in the cavity undulation's exhaust region;
   the fluid conveyed from the intake means to the exhaust means in each cavity undulation as said power transfer means;
   the pressure of the fluid in the volume varying chambers increasing in volume while traversing a cavity undulation act on the rotor wave surface segments which are boundaries of said volume varying chambers and thereby impart a moment to the rotor about its axis which propels the rotor in rotation;
   said rotor rotation effecting said conveyance of fluid and the supply of mechanical power to outside the pump by the power take-off means.

2. A combination as in claim 1 wherein the volume varying chambers increase in volume with their traverse of the fluid transfer region of each cavity undulation.

3. A combination as in claim 1 wherein:
   the volume varying chambers traversing the intake region of each cavity undulation and communicating with the intake means therein increase in volume;

the volume varying chambers traversing and wholly in the fluid transfer region of each cavity undulation have a constant volume;

the volume varying chambers while traversing the exhaust region of each cavity undulation and communicating with the exhaust means therein decrease in volume.

4. A combination as in claim 3 but wherein the volume varying chambers increase in volume with their traverse of the fluid transfer region of each cavity undulation.

5. A combination as in claim 1 wherein the partition's pivotal position in its slot and extension therefrom into the annular cavity is by operative engagement with rotor cam means coacting with mechanical loading means acting between the partition and the casing.

6. A combination as in claim 5 wherein the volume varying chambers increase in volume with their traverse of the fluid transfer region of each cavity undulation.

7. A combination as in claim 5 wherein:

the volume varying chambers traversing the intake region of each cavity undulation and communicating with the intake means therein increase in volume;

the volume varying chambers traversing and wholly in the fluid transfer region of each cavity undulation having a constant volume;

the volume varying chambers while traversing the exhaust region of each cavity undulation and communicating with the exhaust means therein decrease in volume.

8. A combination as in claim 7 but wherein the volume varying chambers increase in volume with their traverse of the fluid transfer region of each cavity undulation.

9. A rotary fluid pump having:

a casing;

a rotor mounted for rotation in the casing;

a power transfer means to outside the device;

the rotor driven in rotation in the casing by the power transfer means;

an annular cavity formed between the casing and the rotor about the rotor axis;

a wave surface on the rotor about the rotor axis which is a boundary surface of the annular cavity and the circumferential extent of the rotor wave surface comprised of at least one rotor wave surface undulation;

a face surface on the casing about the rotor axis which is a boundary surface of the annular cavity and across the annular cavity from the rotor wave surface and facing it;

at least the rotor wave surface and the casing face surface as the boundary surfaces of the annular cavity;

a cavity undulation formed at each rotor wave surface undulation at the annular cavity with said rotor wave surface undulation the rotor wave surface's annular cavity boundary surface of said cavity undulation;

the casing with a plurality of slots which are axially oriented and circumferential spaced about the rotor axis and open to the annular cavity at the face surface;

a partition mounted in each of the casing slots for pivotal, axially directed motion therein and extension therefrom into the annular cavity;

a cam means on the rotor which is circumferential to the rotor axis and outside of the annular cavity;

the rotor cam means operatively engage a portion of each partition and thereby pivotally position it in its slot and in extension therefrom into the annular cavity;

a plurality of circumferential spaced volume varying chambers formed in the annular cavity by the partitions with a volume varying chamber formed between consecutive partitions in the annular cavity;

a cyclic volume variation between minimum and maximum volume in each volume varying chamber with rotation of the rotor in the casing and the consequent traverse of each cavity undulation of the annular cavity to the volume varying chambers;

an intake region in each cavity undulation;

intake means for the transfer of fluid from outside the rotary fluid pump to the volume varying chambers in the intake region of each cavity undulation;

an exhaust region in each cavity undulation;

exhaust means for the transfer of fluid contents of the volume varying chambers in the exhaust region of each cavity undulation to outside the rotary fluid pump;

a fluid sump region in the annular cavity where the ends of neighboring cavity undulations join and each said fluid sump region extends between the exhaust region in one said neighboring cavity undulation and the intake region in the other said neighboring cavity undulation;

a fluid transfer region in each cavity undulation between the intake region and the exhaust region of the cavity undulation;

the partitions' edge surfaces in the annular cavity extending towards the annular cavity surfaces without abutting the annular cavity surfaces towards which they extend;

the edge surfaces of the partitions in each cavity undulation fluid transfer region and each annular cavity sump region maintained in close proximity to the annular cavity surfaces towards which they extend;

the rotor rotation effected volume varying chambers' traverse of each cavity undulation convey fluid from the intake means in the cavity undulation's intake region across the cavity undulation's fluid transfer region to the exhaust means in the cavity undulation's exhaust region.

10. A combination as in claim 9 wherein the volume varying chambers decrease in volume with their traverse of the fluid transfer region of each cavity undulation and thereby compress their fluid contents.

11. A combination as in claim 9 wherein:

the volume varying chambers traversing the intake region of each cavity undulation and communicating with the intake means therein increase in volume;

the volume varying chambers traversing and wholly in the fluid transfer region of each cavity undulation have a constant volume;

the volume varying chambers while traversing the exhaust region of each cavity undulation and communicating with the exhaust means therein decrease in volume.

12. A combination as in claim 11 but wherein the volume varying chambers decrease in volume with their traverse of the fluid transfer region of each cavity undulation and thereby compress their fluid contents.

13. A combination as in claim 9 wherein the partition's pivotal position in its slot and extension therefrom into the annular cavity is by operative engagement with rotor cam means coacting with mechanical loading means acting between the partition and the casing.

14. A combination as in claim 13 wherein the volume varying chambers decrease in volume with their traverse of the fluid transfer region of each cavity undulation and thereby compress their fluid contents.

15. A combination as in claim 13 wherein:
the volume varying chambers traversing the intake region of each cavity undulation and communicating with the intake means therein increase in volume;
the volume varying chambers traversing and wholly in the fluid transfer region of each cavity undulation have a constant volume;
the volume varying chambers while traversing the exhaust region of each cavity undulation and communicating with the exhaust means therein decrease in volume.

16. A combination as in claim 15 but wherein the volume varying chambers decrease in volume with their traverse of the fluid transfer region of each cavity undulation and thereby compress their fluid contents.

17. A rotary fluid pump additionally used as a fluid motor having:
a casing;
a rotor mounted for rotation in the casing;
a power transfer means to outside the device;
the rotor driven in rotation in the casing by the power transfer means;
a power take-off means to supply mechanical power to outside the pump;
an annular cavity formed between the casing and the rotor about the rotor axis;
a wave surface on the rotor about the rotor axis which is a boundary surface of the annular cavity and the circumferential extent of the rotor wave surface is comprised of at least one rotor wave surface undulation;
a face surface on the casing about the rotor axis which is a boundary surface of the annular cavity and across the annular cavity from the rotor wave surface and facing it;
an annular cavity undulation formed at each rotor wave surface undulation at the annular cavity and the rotor wave surface undulation is the rotor wave surface's annular cavity boundary surface of said annular cavity undulation;
the casing with a plurality of slots, which are axially oriented and circumferential spaced about the rotor axis and open to the annular cavity across the face surface in the direction from one perimeter boundary surface to the other perimeter boundary surface;
a partition mounted in each of the casing slots for pivotal, axially directed motion therein and extension therefrom into the annular cavity;
a cam means on the rotor which is circumferential to the rotor axis and outside of the annular cavity;
a portion of each partition operatively engaged by the rotor cam means for its pivotal position in its slot and extension therefrom into the annular cavity;
a plurality of circumferential spaced volume varying chambers formed in the annular cavity by the partitions with a volume varying chamber formed between consecutive partitions in the annular cavity;
a cyclic volume variation between minimum and maximum volume in each volume varying chamber with rotation of the rotor in the casing and the consequent traverse of each annular cavity undulation by the volume varying chambers;
an intake region in each annular cavity undulation;
intake means for the transfer of fluid from outside the rotary fluid pump to the volume varying chambers in the intake region of each annular cavity undulation;
an exhaust region in each annular cavity undulation;
exhaust means for the transfer of fluid contents of the volume varying chambers in the exhaust region of each annular cavity undulation to outside the rotary fluid pump;
a fluid sump region in the annular cavity where the ends of neighboring annular cavity undulations join and each said fluid sump region extends between the exhaust region in one said neighboring annular cavity undulations and the intake region in the other of said neighboring annular cavity undulations;
a fluid transfer region in each annular cavity undulation between the intake region and the exhaust region of the annular cavity undulation;
the partitions' edge surfaces in the annular cavity extending towards the annular cavity surfaces without abutting the annular cavity surfaces towards which they extend;
the partitions edge surfaces in the annular cavity maintained in close proximity to the annular cavity surfaces towards which they extend at least in each annular cavity undulation fluid transfer region and each annular cavity sump region;
the rotor rotation effected volume varying chambers' traverse of each annular cavity undulation convey fluid from said undulation's intake means in its intake region across said undulations's fluid transfer region to said undulation's exhaust means in its exhaust region;
the fluid conveyed from the intake means to the exhaust means in each annular cavity undulation as said power transfer means;
the pressure of the fluid in the volume varying chambers increasing in volume while traversing each annular cavity undulation act on the rotor wave surface segments which are boundaries of said volume varying chambers and thereby impart a moment to the rotor about its axis which propels the rotor in rotation;
said rotor rotation effecting said conveyance of fluid and the supply of rotary mechanical power to outside the pump by the power take-off means.

18. A combination as in claim 17 wherein the volume varying chambers increase in volume with their traverse of the fluid transfer region of each annular cavity undulation.

19. A combination as in claim 17 wherein:
the intake means is comprised of an intake port in the casing, an intake channel in the casing, and an intake aperture in the rotor extending between the casing intake channel and the intake region of each annular cavity undulation and the volume varying chambers therein;

there is an arrangement of the casing intake port, the casing intake channel and the rotor intake aperture in a manner permitting the transfer of fluid from outside the device to the volume varying chambers communicating with the rotor intake aperture;

the exhaust means is comprised of an exhaust port in the casing, an exhaust channel in the casing, and an exhaust aperture in the rotor extending between the casing exhaust channel and the exhaust region of each annular cavity undulation and the volume varying chambers therein;

there is an arrangement of the casing exhaust port, the casing exhaust channel and the rotor exhaust aperture in a manner permitting the transfer of fluid from the volume varying chambers communicating with the rotor exhaust aperture to outside the device.

20. A combination as in claim 17 wherein:

volume varying chambers traversing the intake region of each annular cavity undulation and communicating with the intake means therein increase in volume;

volume varying chambers traversing and wholly in the fluid transfer region of said annular cavity undulation have a constant volume;

volume varying chambers while traversing the exhaust region of said annular cavity undulation and communicating with the exhaust means therein decrease in volume.

21. A combination as in claim 20 but wherein the volume varying chambers increase in volume with their traverse of the fluid transfer region of each annular cavity undulation.

22. A combination as in claim 17 wherein the partition's pivotal position in its slot and extension therefrom into the annular cavity is by operative engagement with rotor cam means coacting with mechanical loading means acting between the partition and the casing.

23. A combination as in claim 22 wherein the volume varying chambers increase in volume with their traverse of the fluid transfer region of each annular cavity undulation.

24. A combination as in claim 22 wherein:

the intake means is comprised of an intake port in the casing, an intake channel in the casing, and an intake aperture in the rotor extending between the casing intake channel and the intake region of each annular cavity undulation and the volume varying chambers therein;

there is an arrangement of the casing intake port, the casing intake channel and the rotor intake aperture in a manner permitting the transfer of fluid from outside the device to the volume varying chambers communicating with the rotor intake aperture;

the exhaust means is comprised of an exhaust port in the casing, an exhaust channel in the casing, and an exhaust aperture in the rotor extending between the casing exhaust channel and the exhaust region of each annular cavity undulation and the volume varying chambers therein;

there is an arrangement of the casing exhaust port, the casing exhaust channel and the rotor exhaust aperture in a manner permitting the transfer of fluid from the volume varying chambers communicating with the rotor exhaust aperture to outside the device.

25. A combination as in claim 22 wherein:

volume varying chambers traversing the intake region of each annular cavity undulation and communicating with the intake means therein increase in volume;

volume varying chambers traversing and wholly in the fluid transfer region of said annular cavity have a constant volume;

volume varying chambers while traversing the exhaust region of said annular cavity undulation and communicating with the exhaust means therein decrease in volume.

26. A combination as in claim 25 but wherein the volume varying chambers increase in volume with their traverse of the fluid transfer region of each annular cavity undulation.

27. A rotary fluid pump having:

a casing;

a rotor mounted for rotation in the casing;

a power transfer means to outside the device;

the rotor driven in rotation in the casing by the power transfer means;

an annular cavity formed between the casing and the rotor about the rotor axis;

a wave surface on the rotor about the rotor axis which is a boundary surface of the annular cavity and the circumferential extent of the rotor wave surface is comprised of at least one rotor wave surface undulation;

a face surface on the casing about the rotor axis which is a boundary surface of the annular cavity and across the annular cavity from the rotor wave surface and facing it;

an annular cavity undulation formed at each rotor wave surface undulation at the annular cavity and the rotor wave surface undulation is the rotor wave surface's annular cavity boundary surface of the said annular cavity undulation;

the casing with a plurality of slots, which are axially oriented and circumferential spaced about the rotor axis and open to the annular cavity across the face surface in the direction from one perimeter boundary surface to the other perimeter boundary surface;

a partition mounted in each of the casing slots for pivotal, axially directed motion therein and extension therefrom into the annular cavity;

a cam means on the rotor which is circumferential to the rotor axis and outside of the annular cavity;

a portion of each partition operatively engaged by the rotor cam means for its pivotal position in its slot and extension therefrom into the annular cavity;

a plurality of circumferential spaced volume varying chambers formed in the annular cavity by the partitions with a volume varying chamber formed between consecutive partitions in the annular cavity;

a cyclic volume variation between minimum and maximum volume in each volume varying chamber with rotation of the rotor in the casing and the consequent traverse of each annular cavity undulation by the volume varying chambers;

an intake region in each annular cavity undulation;

intake means for the transfer of fluid from outside the rotary fluid pump to the volume varying chambers in the intake region of each annular cavity undulation;

an exhaust region in each annular cavity undulation;

exhaust means for the transfer of fluid contents of the volume varying chambers in the exhaust region of each annular cavity undulation to outside the rotary fluid pump;
a fluid sump region in the annular cavity where the ends of neighboring annular cavity undulations join and each said fluid sump region extends between the exhaust region in one of said neighboring annular cavity undulations and the intake region in the other of said neighboring annular cavity undulations;
a fluid transfer region in each annular cavity undulation between the intake region and the exhaust region of the annular cavity undulation;
the partitions edge surfaces in the annular cavity extending towards the annular cavity surfaces without abutting the annular cavity surfaces towards which they extend;
the partitions edge surfaces in the annular cavity maintained in close proximity to the annular cavity surfaces towards which they extend at least in each annular cavity undulation fluid transfer region and each annular cavity sump region;
the rotor rotation effected volume varying chambers' traverse of each annular cavity undulation convey fluid from the intake means in the intake region of said undulation across the fluid transfer region of said undulation to the exhaust means in the exhaust region of said undulation.

28. A combination as in claim 27 wherein:
the intake means is comprised of an intake port in the casing, an intake channel in the casing, and an intake aperture in the rotor extending between the casing intake channel and the intake region of each annular cavity undulation and the volume varying chambers therein;
there is an arrangement of the casing intake port, the casing intake channel and the rotor intake aperture in a manner permitting the transfer of fluid from outside the device to the volume varying chambers communicating with the rotor intake aperture;
the exhaust means is comprised of an exhaust port in the casing, an exhaust channel in the casing, and an exhaust aperture in the rotor extending between the casing exhaust channel and the exhaust region of each annular cavity undulation and the volume varying chambers therein;
there is an arrangement of the casing exhaust port, the casing exhaust channel and the rotor exhaust aperture in a manner permitting the transfer of fluid from the volume varying chambers communicating with the rotor exhaust aperture to outside the device.

29. A combination as in claim 15 wherein:
the intake means is comprised of an intake port in the casing, an intake channel in the casing, and an intake aperture in the rotor extending between the casing intake channel and the intake region of each annular cavity undulation and the volume varying chambers therein;
there is an arrangement of the casing intake port, the casing intake channel and the rotor intake aperture in a manner permitting the transfer of fluid from outside the device to the volume varying chambers communicating with the rotor intake aperture;
the exhaust means is comprised of an exhaust port in the casing, an exhaust channel in the casing, and an exhaust aperture in the rotor extending between the casing exhaust channel and the exhaust region of each annular cavity undulation and the volume varying chambers therein;
there is an arrangement of the casing exhaust port, the casing exhaust channel and the rotor exhaust aperture in a manner permitting the transfer of fluid from the volume varying chambers communicating with the rotor exhaust aperture to outside the device.

30. A combination as in claim 27 wherein:
volume varying chambers traversing the intake region of each annular cavity undulation and communicating with the intake means therein increase in volume;
volume varying chambers traversing and wholly in the fluid transfer region of each annular cavity undulation have a constant volume;
volume varying chambers while traversing the exhaust region of each annular cavity undulation and communicating with the exhaust means therein decrease in volume.

31. A combination as in claim 30 but wherein the volume varying chambers decrease in volume with their traverse of the fluid transfer region of each annular cavity undulation and thereby compress their fluid contents.

32. A combination as in claim 27 wherein the volume varying chambers decrease in volume with their traverse of the fluid transfer region of each annular cavity undulation and thereby compress their fluid contents.

33. A combination as in claim 32 wherein:
the intake means is comprised of an intake port in the casing, an intake channel in the casing, and an intake aperture in the rotor extending between the casing intake channel and the intake region of each annular cavity undulation and the volume varying chambers therein;
there is an arrangement of the casing intake port, the casing intake channel and the rotor intake aperture in a manner permitting the transfer of fluid from outside the device to the volume varying chambers communicating with the rotor intake aperture;
the exhaust means is comprised of an exhaust port in the casing, an exhaust channel in the casing, and an exhaust aperture in the rotor extending between the casing exhaust channel and the exhaust region of each annular cavity undulation and the volume varying chambers therein;
there is an arrangement of the casing exhaust port, the casing exhaust channel and the rotor exhaust aperture in a manner permitting the transfer of fluid from the volume varying chambers communicating with the rotor exhaust aperture to outside the device.

34. A combination as in claim 27 wherein the partition's pivotal position in its slot and extension therefrom into the annular cavity is by operative engagement with rotor cam means coacting with mechanical loading means acting between the partition and the casing.

35. A combination as in claim 34 wherein the volume varying chambers decrease in volume with their traverse of the fluid transfer region of each annular cavity undulation and thereby compress their fluid contents.

36. A combination as in claim 34 wherein:
the intake means is comprised of an intake port in the casing, an intake channel in the casing, and an intake aperture in the rotor extending between the casing intake channel and the intake region of each annular cavity undulation and the volume varying chambers therein;

there is an arrangement of the casing intake port, the casing intake channel and the rotor intake aperture in a manner permitting the transfer of fluid from outside the device to the volume varying chambers communicating with the rotor intake aperture;

the exhaust means is comprised of an exhaust port in the casing, an exhaust channel in the casing, and an exhaust aperture in the rotor extending between the casing exhaust channel and the exhaust region of each annular cavity undulation and the volume varying chambers therein;

there is an arrangement of the casing exhaust port, the casing exhaust channel and the rotor exhaust aperture in a manner permitting the transfer of fluid from the volume varying chambers communicating with the rotor exhaust aperture to outside the device.

37. A combination as in claim 34 wherein:

volume varying chambers traversing the intake region of each annular cavity undulation and communicating with the intake means therein increase in volume;

volume varying chambers traversing and wholly in the fluid transfer region of each annular cavity undulation have a constant volume;

volume varying chambers while traversing the exhaust region of each annular cavity undulation and communicating with the exhaust means therein decrease in volume.

38. A combination as in claim 37 but wherein the volume varying chambers decrease in volume with their traverse of the fluid transfer region of each annular cavity undulation and thereby compress their fluid contents.

* * * * *

UNITED STATES PATENT AND TRADEMARK OFFICE
CERTIFICATE OF CORRECTION

PATENT NO. : 4,747,764

DATED : May 31, 1988

INVENTOR(S) : Joseph F. Frasca

It is certified that error appears in the above-identified patent and that said Letters Patent is hereby corrected as shown below:

Column 2, line 14, "to" should read --of--.

Column 4, line 41, "region(s)" should read --regions--.

Column 5, line 63, "causing" should read --casing--.

Column 6, line 46, "motor" should read --rotor--.

Column 7, line 15, after "embodiments" insert --of--.

Column 8, line 16, "before "pump's" insert --the--.

Column 10, line 13, "segment" should read --segments--.

Column 10, line 65, "partition" should read --partitions--.

Column 10, line 66, "region(s)" should read --regions--.

Column 13, line 13, "chambes" should read --chamber's--.

Column 13, line 15, "chambers" should read --chamber's--.

Column 13, line 21, after means insert --and--.

Column 13, line 25, "chamber's" should read --chambers'--.

Column 15, line 33, after "segment" "a" should read --at--.

Column 15, line 38, "eedge" should read --wedge--.

Column 15, line 65, after "surfaces" insert --,--.

Column 15, line 65, after "each" delete --,--.

Column 16, line 20, before "are" insert --which--.

Column 17, line 45, "206" should read --208--.

Column 17, line 52, "106" should read --108--.

Column 18, line 40, "13" should read --113--.

Column 18, line 44, after "cavity" "undulation" should read --undulations--.

UNITED STATES PATENT AND TRADEMARK OFFICE
CERTIFICATE OF CORRECTION

PATENT NO. : 4,747,764

DATED : May 31, 1988

INVENTOR(S) : Joseph F. Frasca

It is certified that error appears in the above-identified patent and that said Letters Patent is hereby corrected as shown below:

```
Column 19,line 30, "regions" should read --region--.
Column 19,line 57, "326" should read --323--.
Column 19,line 60, delete "its".
Column 21,line 14,"an" should read --a--.
Column 25,line 63,"motor" should read --rotor--.
Column 26,line 17,"1601" should read --6101--.
Column 26,line 67, after "in" insert --the--.
Column 27,line 31, "surfaces" should read --surface--.
Column 28,line 20, after "rotor" insert --in--.
Column 30,line 40, after "which" replace "the" with --they--.
Column 32,line 18, replace "to" with --by--.
Column 37,line 52, replace "15" with --30--.
```

Signed and Sealed this

Twenty-seventh Day of September, 1988

Attest:

DONALD J. QUIGG

Attesting Officer

Commissioner of Patents and Trademarks